(12) United States Patent
Gao et al.

(10) Patent No.: US 12,445,188 B2
(45) Date of Patent: *Oct. 14, 2025

(54) PROCESSING METHOD AND APPARATUS FOR RECOVERING BEAM

(71) Applicant: Godo Kaisha IP Bridge 1, Tokyo (JP)

(72) Inventors: Bo Gao, Guangdong (CN); Yu Ngok Li, Guangdong (CN); Yijian Chen, Guangdong (CN); Zhaohua Lu, Guangdong (CN); Yifei Yuan, Guangdong (CN); Xinhui Wang, Guangdong (CN)

(73) Assignee: Godo Kaisha IP Bridge 1, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/676,251

(22) Filed: May 28, 2024

(65) Prior Publication Data

US 2024/0323943 A1 Sep. 26, 2024

Related U.S. Application Data

(63) Continuation of application No. 17/656,861, filed on Mar. 28, 2022, now abandoned, which is a
(Continued)

(30) Foreign Application Priority Data

Mar. 24, 2017 (CN) .......................... 201710184628.5

(51) Int. Cl.
*H04W 72/044* (2023.01)
*H04B 7/06* (2006.01)
(Continued)

(52) U.S. Cl.
CPC ....... *H04B 7/06964* (2023.05); *H04L 5/0048* (2013.01); *H04L 5/0057* (2013.01);
(Continued)

(58) Field of Classification Search
CPC ... H04W 72/046; H04W 72/21; H04W 72/51; H04W 74/0866; H04W 72/542;
(Continued)

(56) References Cited

U.S. PATENT DOCUMENTS 8,594,053 B2 11/2013 Kim et al.
10,686,505 B2 * 6/2020 Lee ...................... H04B 7/0626
(Continued)

FOREIGN PATENT DOCUMENTS

CN 102273093 A 12/2011
CN 103634037 A 3/2014
(Continued)

OTHER PUBLICATIONS

Extended European Search Report, mailed Jan. 21, 2020, for European Patent Application No. 18771123.9. (13 pages).
(Continued)

*Primary Examiner* — Jay P Patel
(74) *Attorney, Agent, or Firm* — Seed Intellectual Property Law Group LLP

(57) ABSTRACT

The present disclosure provides a processing method and apparatus for recovering a beam. The method includes: generating a first type of signaling comprising an index corresponding to a resource selected from a set of resources for a reference signal; transmitting the first type of signaling over a random access channel to a base station; assuming a Quasi Co-Location (QCL) relation between the selected resource and a downlink control channel, and the selected resource and a downlink data channel; receiving a second type of signaling carried in the downlink control channel using the assumed QCL relation between the selected resource and the downlink control channel, the second type of signaling further comprising an identification of the terminal device; and receiving a data transmission carried in
(Continued)

the downlink data channel according to the QCL relation between the selected resource and the downlink data channel.

6 Claims, 12 Drawing Sheets

Related U.S. Application Data continuation of application No. 16/581,616, filed on Sep. 24, 2019, now Pat. No. 11,291,007, which is a continuation of application No. PCT/CN2018/074993, filed on Feb. 1, 2018.

(51) Int. Cl.
*H04L 5/00* (2006.01)
*H04W 72/21* (2023.01)
*H04W 72/51* (2023.01)
*H04W 74/08* (2009.01)

(52) U.S. Cl.
CPC ......... *H04W 72/046* (2013.01); *H04W 72/21* (2023.01); *H04W 72/51* (2023.01); *H04W 74/0866* (2013.01)

(58) Field of Classification Search
CPC .... H04W 16/28; H04L 5/0048; H04L 5/0057; H04B 7/06966; H04B 7/088; H04B 7/0695; H04B 7/0639; H04B 17/373
See application file for complete search history.

(56) References Cited

U.S. PATENT DOCUMENTS

| | | | |
|---|---|---|---|
| 11,012,882 B2 | 5/2021 | Yum et al. | |
| 11,115,962 B2 | 9/2021 | Kang et al. | |
| 11,229,029 B2 | 1/2022 | Kang et al. | |
| 11,751,185 B2 | 9/2023 | Ahn et al. | |
| 2014/0086173 A1 | 3/2014 | Sadeghi et al. | |
| 2014/0314000 A1 | 10/2014 | Liu et al. | |
| 2015/0092768 A1 | 4/2015 | Ng et al. | |
| 2015/0189574 A1 | 7/2015 | Ng et al. | |
| 2015/0237617 A1 | 8/2015 | Chen | |
| 2016/0112943 A1 | 4/2016 | Horn et al. | |
| 2016/0135181 A1 | 5/2016 | Nogami et al. | |
| 2016/0149681 A1 | 5/2016 | Vajapeyam et al. | |
| 2017/0207843 A1 | 7/2017 | Jung et al. | |
| 2017/0207891 A1 | 7/2017 | Yi et al. | |
| 2017/0331577 A1 | 11/2017 | Parkvall et al. | |
| 2017/0331670 A1 | 11/2017 | Parkvall et al. | |
| 2018/0048442 A1* | 2/2018 | Sang .................. | H04W 72/046 |
| 2018/0219606 A1 | 8/2018 | Ng et al. | |
| 2018/0278310 A1* | 9/2018 | Lee .................... | H04B 7/0632 |
| 2018/0279229 A1 | 9/2018 | Dinan et al. | |
| 2018/0301804 A1 | 10/2018 | Gao et al. | |
| 2019/0200249 A1 | 6/2019 | Yoon et al. | |
| 2019/0319686 A1 | 10/2019 | Chen, IV et al. | |
| 2019/0349915 A1 | 11/2019 | Ahn et al. | |
| 2019/0349960 A1 | 11/2019 | Li et al. | |
| 2019/0356438 A1 | 11/2019 | Lee et al. | |
| 2019/0356439 A1 | 11/2019 | Lee et al. | |
| 2019/0364605 A1 | 11/2019 | Loehr et al. | |
| 2019/0387440 A1 | 12/2019 | Yiu et al. | |
| 2020/0014453 A1 | 1/2020 | Takeda et al. | |
| 2020/0022040 A1 | 1/2020 | Chen et al. | |
| 2020/0028609 A1 | 1/2020 | Ahn et al. | |
| 2020/0036430 A1 | 1/2020 | Kim et al. | |
| 2020/0045572 A1 | 2/2020 | Yum et al. | |
| 2020/0059290 A1 | 2/2020 | Pan et al. | |
| 2020/0099437 A1 | 3/2020 | Harada et al. | |
| 2020/0112993 A1 | 4/2020 | Tsai et al. | |
| 2020/0119839 A1 | 4/2020 | Jo et al. | |
| 2020/0145079 A1 | 5/2020 | Marinier et al. | |
| 2020/0196301 A1 | 6/2020 | Lee et al. | |
| 2020/0313742 A1* | 10/2020 | Lee .................... | H04B 7/0626 |
| 2020/0336193 A1 | 10/2020 | Park et al. | |
| 2020/0389220 A1 | 12/2020 | Kang et al. | |
| 2021/0084640 A1 | 3/2021 | Kang et al. | |
| 2021/0126689 A1 | 4/2021 | Park et al. | |
| 2021/0136768 A1 | 5/2021 | Kang et al. | |
| 2021/0204266 A1 | 7/2021 | Ahn et al. | |
| 2021/0281305 A1 | 9/2021 | Grant et al. | |
| 2023/0208490 A1 | 6/2023 | Kim et al. | |

FOREIGN PATENT DOCUMENTS

| | | |
|---|---|---|
| CN | 103718591 A | 4/2014 |
| CN | 103856894 A | 6/2014 |
| CN | 103875191 A | 6/2014 |
| CN | 103945541 A | 7/2014 |
| CN | 104202073 A | 12/2014 |
| CN | 104205911 A | 12/2014 |
| CN | 105093191 A | 11/2015 |
| CN | 106465375 A | 2/2017 |
| EP | 3100488 A1 | 12/2016 |
| WO | WO 2010081159 A1 | 7/2010 |
| WO | WO 2013147505 A1 | 10/2013 |
| WO | WO 2017022902 A1 | 2/2017 |
| WO | WO 2017029213 A1 | 2/2017 |
| WO | WO 2017044144 A1 | 3/2017 |

OTHER PUBLICATIONS

International Search Report and Written Opinion, mailed Apr. 12, 2018, for International Application No. PCT/CN2018/074993. (9 pages).
NTT Docomo, Inc., "Views on mechanism to recover from beam failure," R1-1702799, 3GPP TSG RAN WG1 Meeting #88, Athens, Greece, Feb. 2017. (4 pages).
Qualcomm Incorporated, "Beam Recovery Procedures," R1-1702606, 3GPP TSG-RAN WG1 #88, Athens, Greece, Feb. 2017. (8 pages).
Samsung et al., "WF on beam indication and reporting," R1-1613727, 3GPP TSG RAN WG1 Meeting #87, Reno, USA, Nov. 14-18, 2016, (5 pages).
State Intellectual Property Office of the P.R. China, International Search Report and Written Opinion, dated Apr. 12, 2018, for International Patent Application No. PCT/CN2018/074993. (13 pages).
State Intellectual Property Office of the P.R. China, Office Action, dated Aug. 4, 2020, for Chinese Patent Application No. 2017101846285. (23 pages).
Zte et al., "Beam related indication for DL and UL beam management," R1-1700123, 3GPP TSG RAN WG1 NR Ad-Hoc Meeting, Spokane, USA, Jan. 16-20, 2017. (7 pages).
Zte et al., "Discussion on beam recovery mechanism," R1-1701803, 3GPP TSG RAN WG1 Meeting #88, Athens, Greece, Feb. 2017. (6 pages).

* cited by examiner

PROCESSING METHOD AND APPARATUS FOR RECOVERING BEAM

CROSS-REFERENCE TO RELATED APPLICATION(S)

This patent document is a continuation of and claims the benefit of priority to U.S. patent application Ser. No. 17/656,861, entitled "PROCESSING METHOD AND APPARATUS FOR RECOVERING BEAM", filed Mar. 28, 2022, which claims the benefit of priority to U.S. patent application Ser. No. 16/581,616, entitled "PROCESSING METHOD AND APPARATUS FOR RECOVERING BEAM", filed Sep. 24, 2019, now U.S. Pat. No. 11,291,007, which is a continuation and claims the benefit of priority to International Patent Application No. PCT/CN2018/074993, filed on Feb. 1, 2018, which claims the benefit of priority to Chinese Patent Application No. 201710184628.5, filed on Mar. 24, 2017. The entire contents of the before-mentioned patent applications are incorporated by reference as part of the disclosure of this application.

BACKGROUND

The present disclosure relates to the field of communications, and in particular, to a processing method and apparatus for recovering a beam.

Ultra-wide bandwidth high-frequency band (i.e., millimeter wave communication) in the related art has become an important development direction of mobile communication in the future, and attracted the attention of academic and industrial circles around the world. In particular, the advantages of millimeter waves become increasingly attractive when the increasingly congested spectrum resources and physical networks are heavily accessed. Various standards organizations, e.g., IEEE, 3GPP, begin corresponding standardized works. For example, in the 3GPP standard organization, high-frequency band communication will become an important innovation point of 5G New Radio Access Technology (New RAT) by virtue of its significant advantages of large bandwidth.

However, high-frequency band communication also faces challenges of link attenuation, including great loss of propagation path, more air (especially, oxygen) absorption, heavy influence of rain fade and the like. In facing these challenges, a high-frequency band communication system may obtain high antenna gain against signal transmission loss through a multi-antenna array and a beamforming solution by using characteristics such as a short wavelength of the high-frequency band and easy antenna integration, so as to guarantee link margin and improve communication robustness.

In a training process of antenna weight (also known as, precoding, beam), a high-frequency band sending end sends a training pilot, and a receiving end receives a channel and executes channel estimation. Next, the high-frequency band receiving end has to feed back channel state information to a training sending end, so that a transmitting-receiving end finds multiple groups of transmitting-receiving end antenna weight pairs required for multiplex data transmission from selectable transmitting-receiving end antenna weight pairs, thereby improving the overall spectrum frequency.

In a millimeter wave communication system, directed beam communication also reduces diversity of signals in space propagation while obtaining the current link gain, and further may face influence of moving users and blocked channels, which causes poor robustness of directed communication. In particular, in a scene in which a UE moves fast, or during Discontinuous Reception (DRX), the reliability of wireless communication cannot be guaranteed while communicating again.

For the abovementioned technical problems, a beam link recovery procedure after beam link failure and a solution of realizing beam link recovery are not provided in the related art.

For the abovementioned problems existing in the related art, an effective solution has not been found currently.

BRIEF SUMMARY

Embodiments of the present disclosure provide a processing method and apparatus for recovering a beam to at least solve the technical problems that a link cannot be recovered after beam link failure, and beam and channel state information reports or beam and channel state information report requests cannot be actively initiated in a millimeter wave communication system.

An embodiment of the present disclosure provides a processing method for recovering a beam, including: generating a first type of signaling when K elements in a beam related parameter set trigger one or more thresholds; and sending the first type of signaling to a second communication node, the beam related parameter set including Q elements, where Q and K are both positive integers, and K is less than or equal to Q.

Optionally, the first type of signaling includes at least one of the following: one piece of or a group of beam report information, or a scheduling request, and the beam report information is represented by at least one of the following information sent by the first communication node or the second communication node: a reference signal port index, a reference signal resource index, a reference signal resource set index, a reference signal resource allocation index, an index corresponding to an element in a search space set, or an index corresponding to an element in an agreed beam set.

Optionally, the beam report information is represented by a time-frequency resource location occupied by the first type of signaling.

Optionally, the scheduling request contains signaling of sending a beam report request to the second communication node by the first communication node.

Optionally, the method further includes: receiving a scheduling request response to the scheduling request from the second communication node; and executing a beam report on a resource allocated by the scheduling request response, the allocated resource including: an uplink control channel, or an uplink data channel; when the allocated resource is the uplink control channel, the beam report is carried by Uplink Control Information (UCI); and when the allocated resource is the uplink data channel, the beam report is carried by a Medium Access Control-Control Element (MAC-CE) or a Radio Resource Control (RRC) signaling.

Optionally, the beam report includes at least one of the following information: a reference signal type, a reference signal resource set index, a reference signal resource index, a reference signal port index, an index corresponding to an element in a search space set, an index corresponding to an element in an agreed beam set, a beam grouping index, a received beam grouping index, or an antenna grouping index.

Optionally, an association of reference signal resource allocation indexes refers to satisfying a Quasi Co-Location (QCL) assumption with the resource allocation index.

Optionally, before the sending the first type of signaling to a second communication node, the method further includes: receiving a channel set which is able to carry the first type of signaling and is indicated by a configuration of the second communication node, the channel set including one or a combination of the following: a dedicated channel, a Physical Random Access Channel (PRACH), a configured grant channel, or a scheduling request resource; the dedicated channel is for carrying the first type of signaling, occupies a same time domain resource with or different time domain resources from the PRACH channel and the configured grant channel but is orthogonal to the PRACH channel and the configured grant channel; and the scheduling request resource refers to a scheduling request resource dedicated to the second communication node and allocated by the first communication node to the second communication node, every D subframes appears once, where D is an integer greater than or equal to 1.

Optionally, the first communication node selects a subset from the channel set to carry and send the first type of signaling.

Optionally, a plurality of dedicated channels constitutes a dedicated channel set.

Optionally, the first type of signaling is sent repeatedly in the dedicated channel in the dedicated channel set for executing beam scanning, measurement and decision from the first communication node to the second communication node.

Optionally, a configuration signaling of the PRACH indicates in a binding manner a structure of the dedicated channel set.

Optionally, after the sending the first type of signaling to a second communication node, the method further includes: using a beam indicated in the beam report information to receive a second type of signaling sent by the second communication node, the second type of signaling being configured to identify that the second communication node confirms the first type of signaling of the first communication node.

Optionally, the second type of signaling includes: one piece of or a group of beam report information, the beam indication information being represented by at least one of the following information sent by the first communication node or the second communication node: a reference signal port index, a reference signal resource index, a reference signal resource set index, a reference signal resource allocation index, an index corresponding to an element in a search space set, or an index corresponding to an element in an agreed beam set.

Optionally, the beam indication information is represented by a time-frequency resource location occupied by the second type of signaling.

Optionally, when a beam correspondence between uplink and downlink of the first communication node satisfies a condition, the first type of signaling excludes the beam report information.

Optionally, the first type of signaling is used for at least one of the following: actively initiating a beam report; applying for a scheduling resource; initiating a beam link recovery; or initiating a beam link establishment.

Optionally, the beam related parameter set includes one of the following: qualities of a first type of beam links with a number of N; a difference or a ratio of qualities of a first type of beam links with a number of N to a sum of qualities of a second type of beam links with a number of K; a correlation of time-frequency channel responses or frequency-domain channel responses and a space domain correlation of a first type of beam links with a number of N and a second type of beam links with a number of K; a difference or a ratio of azimuth angles of a first type of beam links with a number of N to azimuth angles of a second type of beam links with a number of K; qualities of a second type of beam links with a number of K; qualities of all the second type of beam links; cumulative time from a last successful reception of an uplink control channel or data channel; a cumulative number of unsuccessful receptions; adjustment information of beam grouping; or a weighted value or a weighted correlation value of parameters included in the beam related parameter set. The second type of beam links is associated with S configured beam link sets or S1 activated sets in the S configured beam link sets; the first type of beam links refers to not from the S configured beam link sets or the S1 activated sets in the S configured beam link sets; the configured beam links are beam links reported to the second communication node by the first communication node or beam links indicated to the first communication node by the second communication node; where N, K, S and S1 are integers greater than or equal to 1, and S1 is less than or equal to S.

Optionally, the configured beam links include: beam links indicated to the first communication node by the second communication node, or beam links reported to the second communication node by the first communication node.

Optionally, a beam link corresponds to one of the following: a transmitting beam, a receiving beam, a transmitting-receiving beam pair, a beam group, a receiving beam group, a transmitting beam group, a receiving mode, an antenna combination, or a control channel.

Optionally, a quality of a beam link includes one of the following: a BLER, a received signal power, an RSRP, an RSRQ, a channel capacity, a signal to interference plus noise ratio of a receiving end, or a signal to noise ratio of a receiving end.

Optionally, the first type of signaling is an element of a configured or predefined signaling set.

Optionally, the element of the signaling set is composed of a sequence, or a sequence and frequency domain resources occupied by the sequence, or a sequence and time domain resources used by the sequence, or a group of sequence numbers and time-frequency resources occupied by the group, or a group of sequence numbers and time-frequency resources occupied by the group and hopping according to a specific function.

Optionally, elements of the signaling set are exclusive to the first communication node or shared by B first communication nodes, where B is an integer greater than 1.

Optionally, the signaling set is configured by one of the following: configured by the first communication node; configured by the second communication node, where a configuration request is sent by the first communication node; configured by the second communication node; configured by the first communication node and selected to be valid by the second communication node; or configured by the second communication node, and selected to be valid by the first communication node.

Optionally, a condition of configuring or sending the configuration request by the first communication node includes at least one of the following that: the condition is entering a DRX mode; the quality of each of the second type of beam links with the number of K is inferior to a first threshold; the quality of all the second type of beam links is inferior to a second threshold; cumulative time from a last successful reception of the control channel/data channel is greater than a third threshold; a cumulative number of unsuccessful receptions is greater than a fourth threshold; or a weighted value or a weighted correlation value of a part of the above parameters satisfies a requirement of a fifth threshold.

Optionally, the element of a set of the first type of signaling relates to a configuration parameter of at least one of the following: an identity of the first communication node; carrying O time-frequency resources sent by the first type of signaling; a correspondence between a location of a time-frequency resource sent by the first type of signaling and a reference signal indicated by the location; a transmission mode of sending a control signaling to the first communication node by the second communication node after sending the first type of signaling; time-frequency resource or a range of time-frequency resources occupied by sending a control signaling to the first communication node by the second communication node after sending the first type of signaling; a blind test criterion of sending a control signaling to the first communication node by the second communication node after sending the first type of signaling; a sending configuration of a reference signal sent to the second communication node by the first communication node; a measurement configuration of a reference signal sent to the second communication node by the first communication node; a report configuration of a reference signal sent to the second communication node by the first communication node; a sending configuration of a reference signal sent to the first communication node by the second communication node; a measurement configuration of a reference signal sent to the first communication node by the second communication node; or a report configuration of a reference signal sent to the first communication node by the second communication node; where O is an integer greater than or equal to 1.

Optionally, the element of the signaling set further includes: a dedicated contention-free sequence when the PRACH is accessed.

Optionally, the sending configuration of the reference signal includes at least one of the following parameters: a reference signal type, an antenna port, a reference signal resource, or a time-frequency resource or a range of time-frequency resources occupied by the reference signal resource.

Optionally, a part or all of the parameters indicated by the first type of signaling is joint-encoded and/or joint-identified.

Optionally, the first type of signaling further includes a backup beam measurement signaling, where the backup beam measurement signaling refers to sending a reference signal, a control channel or a data channel by the second communication node using a preconfigured element which is in a beam set of the first communication node.

Optionally, the identity of the first communication node includes one of the following: an identity symbol exclusive to the first communication node, a shared identity symbol by which a plurality of first communication nodes are configured, or an identity number obtained by contention.

Optionally, when the signaling set is a configured signaling set, the configured signaling set has a valid time window after which the configured signaling set is invalid.

Optionally, there is at least one valid time window which respectively faces to at least one of signalings in the signaling set or parameters in the signaling set.

Optionally, configuring the valid time window includes one or a combination of the following: starting from the current configuration and being invalid until the next reconfiguration; starting from the current configuration and being invalid after T time units; starting from the current configuration and being invalid after the Y1th time of sending of the first type of signaling, or the Y2th time of successful reception of the first type of signaling, or the Y3th time of sending of the second type of signaling, or the Y4th time of successful reception of the second type of signaling; invalid after T time units when a triggering threshold satisfies a condition; invalid after T time units after the last time the first communication node feeds back ACK/NACK to the second communication node; invalid after T time units after the last time the first communication node receives the ACK/NACK fed back by the second communication node; invalid after T time units after the last time the second communication node sends ACK/NACK to the first communication node; or invalid after T time units after the last time the second communication node sends ACK/NACK to the first communication node; T, Y1, Y2, Y3 and Y4 are integers greater than or equal to 1, and T, Y1, Y2, Y3 and Y4 may be predefined or configured by the first communication node or the second communication node.

Optionally, a physical layer of the first communication node sends a link failure request to a high layer after the number of times that the first communication node sends the first type of signaling to the second communication node, or cumulative waiting time or a combination of the number of times and the cumulative waiting time exceeds a sixth threshold.

Optionally, sending power for sending the first type of signaling to the second communication node satisfies one of the following: complying with a power sending rule of a PRACH; sending in full power; or sending using a weighted value of previous powers.

Optionally, after sending the first type of signaling, the method further includes: at least one of a reference signal, a downlink control channel or a downlink data channel which is sent to the first communication node by the second communication node, or a reference signal of a first type of information indication beams satisfy a QCL assumption by default.

Optionally, after sending the second type of signaling, the method further includes: at least one of a reference signal, an uplink control channel or an uplink data channel sent to the second communication node by the first communication node, or a reference signal of a second type of information indication beams satisfy a QCL assumption by default.

Optionally, the second type of signaling contains identity information of the first communication node.

Optionally, the second type of signaling further contains at least one of the following information: a sending configuration of a reference signal sent to the second communication node by the first communication node; a measurement configuration of a reference signal sent to the second communication node by the first communication node; a report configuration of a reference signal sent to the second communication node by the first communication node; a sending configuration of a reference signal sent to the first communication node by the second communication node; a measurement configuration of a reference signal sent to the first communication node by the second communication node; or a report configuration of a reference signal sent to the first communication node by the second communication node.

Optionally, when the first type of signaling is unable to uniquely indicate the identity of the first communication node, after receiving the second type of signaling, the first communication node sends a third type of signaling to the second communication node, where the third type of signaling contains a unique identity of the first communication node.

Optionally, after sending the third type of signaling, the method further includes: the first communication node attempting to receive a fourth type of signaling from the second communication node, where the fourth type of signaling contains the unique identity of the first communication node, or the fourth type of signaling represents a beam link establishment of the first communication node and the second communication node based on a case in which the fourth type of signaling is able to be successfully received and decoded according to the unique identity of the first communication node.

An embodiment of the present disclosure provides another processing method for recovering a beam, applied to a second communication node, including: receiving a first type of signaling, where the first type of signaling is generated by a first communication node according to triggering thresholds of K elements in a beam related parameter set; and executing a beam link recovery using the K elements when a beam link from the first communication node to the second communication node is interrupted, where the beam related parameter set contains Q elements, where Q and K are both positive integers, and K is less than or equal to Q.

Optionally, the first type of signaling is used for at least one of the following: actively initiating a beam report; applying for a scheduling resource; initiating a beam link recovery; or initiating a beam link establishment.

Another embodiment of the present disclosure provides a processing apparatus for recovering a beam, applied to a first communication node, including: a generating module configured to generate a first type of signaling according to triggering thresholds of K elements in a beam related parameter set; and a sending module configured to send the first type of signaling to a second communication node, where the beam related parameter set contains Q elements, where Q and K are both positive integers, and K is less than or equal to Q.

Optionally, the first type of signaling includes at least one of the following: one piece of or a group of beam report information, or a scheduling request; where the beam report information is represented by at least one of the following information sent by the first communication node or the second communication node: a reference signal port index, a reference signal resource index, a reference signal resource set index, a reference signal resource allocation index, an index corresponding to an element in a search space set, or an index corresponding to an element in an agreed beam set.

Optionally, the first type of signaling is used for at least one of the following: actively initiating a beam report; applying for a scheduling resource; initiating a beam link recovery; or initiating a beam link establishment.

Another embodiment of the present disclosure provides another processing apparatus for recovering a beam, applied to a second communication node, including: a receiving module configured to receive a first type of signaling, where the first type of signaling is generated by a first communication node according to triggering thresholds of K elements in a beam related parameter set; and a processing module configured to execute a beam link recovery using the K elements when a beam link from the first communication node to the second communication node is interrupted, where the beam related parameter set contains Q elements, where Q and K are both positive integers, and K is less than or equal to Q.

Optionally, the first type of signaling is used for at least one of the following: actively initiating a beam report; applying for a scheduling resource; initiating a beam link recovery; or initiating a beam link establishment.

A further embodiment of the present disclosure further provides a storage medium. The storage medium is configured to store a program code for performing the following steps: generating a first type of signaling according to triggering thresholds of K elements in a beam related parameter set; and sending the first type of signaling to a second communication node.

According to the present disclosure, a first type of signaling is generated according to triggering thresholds of K elements in a beam related parameter set; the first type of signaling is sent to a second communication node; where the beam related parameter set contains Q elements, where Q and K are both positive integers, and K is less than or equal to Q; and technical problems that a beam cannot be recovered after beam link failure, and beam and channel state information reports or beam and channel state information report requests cannot be actively initiated in a millimeter wave communication system are solved.

BRIEF DESCRIPTION OF THE DRAWINGS

The accompanying drawings illustrated herein provide a further understanding of the present disclosure and constitute a part of the present application. The exemplary embodiments and the description thereof are used to explain the present disclosure without unduly limiting the scope of the present disclosure. In the accompanying drawings.

DETAILED DESCRIPTION

The present disclosure will be further illustrated hereinafter in conjunction with embodiments and accompanying drawings. It should be noted that the embodiments and the features of the embodiments in the present application can be combined with each other without conflict.

It should be noted that terms "first", "second" and the like in the specification, the claims and the accompanying drawings of the present disclosure are used to distinguish similar objects without describing a specific order or sequence.

Embodiment 1

Figure 1:
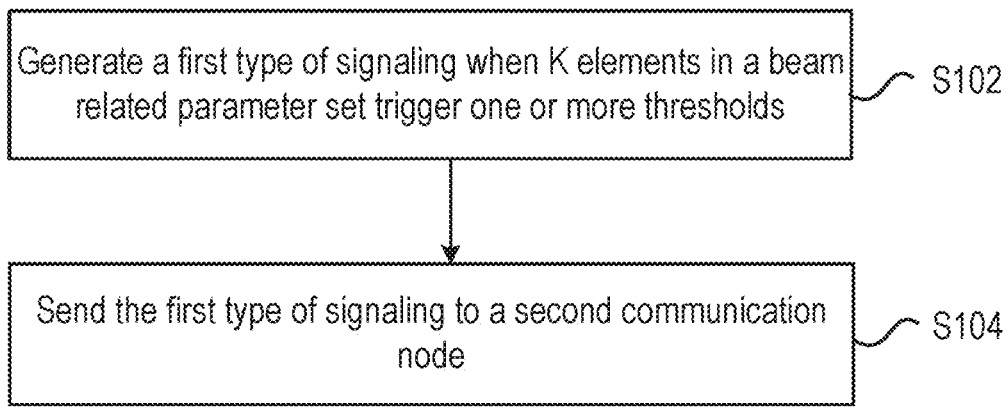
FIG. 1 is a flowchart of a processing method for recovering a beam according to an embodiment of the present disclosure.

This embodiment provides a processing method for recovering a beam, applied to a first communication node. FIG. 1 is a flowchart of a processing method for recovering a beam according to an embodiment of the present disclosure. As shown in FIG. 1, the process includes the following steps: step S102: a first type of signaling is generated when K elements in a beam related parameter set trigger one or more thresholds, and each threshold in the one or more thresholds may be the same or different; and step S104: the first type of signaling is sent to a second communication node, where the beam related parameter set contains Q elements, where Q and K are both positive integers, and K is less than or equal to Q.

Through the abovementioned steps, the first type of signaling is generated when K elements in the beam related parameter set trigger one or more thresholds; and the first type of signaling is sent to the second communication node; where the beam related parameter set contains Q elements, where Q and K are both positive integers, and K is less than or equal to Q; and the technical problems that a beam cannot be recovered after beam link failure and beam and channel state information reports or beam and channel state information report requests cannot be actively initiated in a millimeter wave communication system are solved, more particularly, when quality of the beam link decreases or a new preferable link is discovered.

Figure 2:
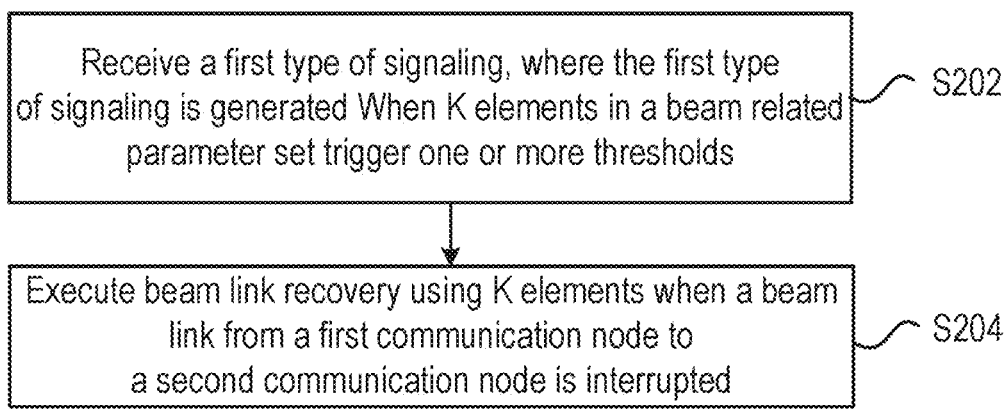
FIG. 2 is a flowchart of another processing method for recovering a beam according to an embodiment of the present disclosure.

This embodiment provides a processing method for recovering a beam, applied to a first communication node. FIG. 2 is a flowchart of another processing method for recovering a beam according to an embodiment of the present disclosure. As shown in FIG. 2, the process includes the following steps: step S202: the first type of signaling is received, where the first type of signaling is generated when K elements in the beam related parameter set trigger one or more thresholds; and step S204: beam link recovery is executed using K elements when a beam link from the first communication node to the second communication node is interrupted, where the beam related parameter set contains Q elements, where Q and K are both positive integers, and K is less than or equal to Q.

Optionally, for execution subjects of the abovementioned steps, the first communication node is a terminal, and the second communication node may be a base station, but not limited thereto.

Optionally, the first type of signaling includes at least one of the following: one piece of or a group of beam report information, or a scheduling request; where the beam report information is represented by at least one of the following information sent by the first communication node or the second communication node: a reference signal port index, a reference signal resource index, a reference signal resource set index, a reference signal resource allocation index, an index corresponding to an element in a search space set, or an index corresponding to an element in an agreed beam set.

Optionally, the beam report information is represented by a time-frequency resource location occupied by the first type of signaling.

Optionally, the scheduling request contains signaling of sending a beam report request to the second communication node by the first communication node.

In optional implementation according to this embodiment, a solution of this embodiment further includes: S11, receiving a scheduling request response to the scheduling request from the second communication node; and S12, executing a beam report on a resource allocated by the scheduling request response; where the allocated resource includes: an uplink control channel, or an uplink data channel; when the allocated resource is the uplink control channel, the beam report is carried by UCI; and when the allocated resource is the uplink data channel, the beam report is carried by a MAC-CE or RRC signaling. Optionally, the beam report includes at least one of the following: a reference signal type, a reference signal resource set index, a reference signal resource index, a reference signal port index, an index corresponding to an element in a search space set, an index corresponding to an element in an agreed beam set, a beam grouping index, a received beam grouping index, or an antenna grouping index.

Optionally, an association of reference signal resource allocation indexes refers to satisfying a QCL assumption with the resource allocation index.

In optional implementation according to this embodiment, before the sending the first type of signaling to the second communication node, the method further includes: S21, receiving a channel set which is able to carry the first type of signaling and is indicated by a configuration of the second communication node, where the channel set includes one or a combination of the following: a dedicated channel, a PRACH, a configured grant channel, or a scheduling request resource; and the dedicated channel is for carrying the first type of signaling, occupies a same time domain resource with or different time domain resources from the PRACH channel and the configured grant channel but is orthogonal to the PRACH channel and the configured grant channel; the scheduling request resource refers to a scheduling request resource dedicated to the second communication node and allocated by the first communication node to the second communication node; and every D subframes appears once, where D is an integer greater than or equal to 1.

Optionally, the first communication node selects a subset from the channel set to carry and send the first type of signaling.

In this embodiment, a plurality of dedicated channels may constitute a dedicated channel set.

Optionally, the first type of signaling is sent repeatedly in the dedicated channel in the dedicated channel set for executing beam scanning, measurement and decision from the first communication node to the second communication node.

Optionally, a configuration signaling of the PRACH indicates in a binding manner a structure of the dedicated channel set.

In optional implementation according to this embodiment, after sending the first type of signaling to the second communication node, the method further includes: S31, using a beam indicated in the beam report information to receive a second type of signaling sent by the second communication node, where the second type of signaling is configured to identify that the second communication node confirms the first type of signaling of the first communication node.

Optionally, the second type of signaling includes: one piece of or a group of beam report information, where the beam indication information is represented by at least one of the following information sent by the first communication node or the second communication node: a reference signal port index, a reference signal resource index, a reference signal resource set index, a reference signal resource allocation index, an index corresponding to an element in a search space set, or an index corresponding to an element in an agreed beam set.

Optionally, the beam report information is represented by a time-frequency resource location occupied by the second type of signaling.

Optionally, when a beam correspondence between uplink and downlink of the first communication node satisfies a condition, the first type of signaling excludes the beam report information.

Optionally, the first type of signaling is used for at least one of the following: actively initiating a beam report; applying for a scheduling resource; initiating a beam link recovery; or initiating a beam link establishment. The first type of signaling is used for link recovery and beam and channel state information reports or beam and channel state information report requests initiated by the first communication node.

Optionally, the beam related parameter set includes one of the following: qualities of a first type of beam links with a number of N; a difference or ratio of qualities of a first type of beam links with a number of N to a sum of qualities of a second type of beam links with a number of K; a correlation of time-frequency channel responses or frequency-domain channel responses and a space domain correlation of a first type of beam links with a number of N and a second type of beam links with a number of K; a difference or a ratio of azimuth angles of a first type of beam links with a number of N to azimuth angles of a second type of beam links with a number of K; qualities of a second type of beam links with a number of K; qualities of all the second type of beam links; cumulative time from a last successful reception of an uplink control channel or data channel; a cumulative number of unsuccessful receptions; adjustment information of beam grouping; or a weighted value or a weighted correlation value of parameters included in the beam related parameter set; where the second type of beam links is associated S configured beam link sets or S1 activated sets in the S configured beam link sets; the first type of beam links refers to not from the S configured beam link sets or the S1 activated sets in the S configured beam link sets; the configured beam links are beam links reported to the second communication node by the first communication node or beam links indicated to the first communication node by the second communication node; where N, K, S and S1 are integers greater than or equal to 1, and S1 is less than or equal to S.

As an example, the quality of the first type of beam links may refer to the quality of the unidentified beam links, and the quality of the second type of beam links may refer to the quality of the identified beam links.

Optionally, the configured beam links include: beam links indicated to the first communication node by the second communication node, or beam links reported to the second communication node by the first communication node.

Optionally, a beam link corresponds to one of the following: a transmitting beam, a receiving beam, a transmitting-receiving beam pair, a beam group, a receiving beam group, a transmitting beam group, a receiving mode, an antenna combination, or a control channel.

Optionally, a quality of a beam link includes one of the following: a block error ratio (for short, BLER), a received signal power, a reference signal receiving power (for short, RSRP), a reference signal receiving quality (for short, RSRQ), a channel capacity, a signal to interference plus noise ratio of a receiving end, or a signal to noise ratio of a receiving end.

Optionally, the first type of signaling is an element of a configured or predefined signaling set.

Optionally, the element of the signaling set is composed of a sequence, or a sequence and frequency domain resources occupied by the sequence, or a sequence and time domain resources used by the sequence, or a group of sequence numbers and time-frequency resources occupied by the group, or a group of sequence numbers and time-frequency resources occupied by the group and hopping according to a specific function.

Optionally, elements of the signaling set are exclusive to the first communication node or shared by B first communication nodes, where B is an integer greater than 1.

In this embodiment, the signaling set is configured by one of the following: configured by the first communication node; configured by the second communication node, where a configuration request is sent by the first communication node; configured by the second communication node; configured by the first communication node and selected to be valid by the second communication node; or configured by the second communication node, and selected to be valid by the first communication node.

In this embodiment, a condition of configuring or sending the configuration request by the first communication node includes at least one of the following that: the condition is entering a DRX mode; the quality of each of the second type of beam links with the number of K is inferior to a first threshold; the quality of all the second type of beam links is inferior to a second threshold; cumulative time from a last successful reception of the control channel/data channel is greater than a third threshold; a cumulative number of unsuccessful receptions is greater than a fourth threshold; or a weighted value or a weighted correlation value of a part of the above parameters satisfies a requirement of a fifth threshold.

In this embodiment, the element of a set of the first type of signaling relates to a configuration parameter of at least one of the following: an identity of the first communication node; carrying O time-frequency resources sent by the first type of signaling; a correspondence between a location of a time-frequency resource sent by the first type of signaling and a reference signal indicated by the location; a transmission mode of sending a control signaling to the first communication node by the second communication node after sending the first type of signaling; time-frequency resources or a range of time-frequency resources occupied by sending a control signaling to the first communication node by the second communication node after sending the first type of signaling; a blind test criterion of sending a control signaling to the first communication node by the second communication node after sending the first type of signaling; a sending configuration of a reference signal sent to the second communication node by the first communication node; a measurement configuration of a reference signal sent to the second communication node by the first communication node; a report configuration of a reference signal sent to the second communication node by the first communication node; a sending configuration of a reference signal sent to the first communication node by the second communication node; a measurement configuration of a reference signal sent to the first communication node by the second communication node; or a report configuration of a reference signal sent to the first communication node by the second communication node; where O is an integer greater than or equal to 1.

Optionally, the element of the signaling set further includes: a dedicated contention-free sequence when the PRACH is accessed.

Optionally, the sending configuration of the reference signal includes at least one of the following parameters: a reference signal type, an antenna port, a reference signal resource, or a time-frequency resource or a range of time-frequency resources occupied by the reference signal resource.

Optionally, a part or all of the parameters indicated by the first type of signaling is joint-encoded and/or joint-identified.

Optionally, the first type of signaling further includes backup beam measurement signaling, where the backup beam measurement signaling refers to sending a reference signal, a control channel or a data channel by the second communication node using a preconfigured element which is in a beam set of the first communication node.

Optionally, the identity of the first communication node includes one of the following: an identity symbol exclusive to the first communication node, a shared identity symbol by which a plurality of first communication nodes are configured, or an identity number obtained by contention.

Optionally, when the signaling set is a configured signaling set, the configured signaling set has a valid time window after which the configured signaling set is invalid.

Optionally, there is at least one valid time window which respectively faces to at least one signaling in the signaling set or parameters in the signaling set.

Optionally, configuring the valid time window includes one or a combination of the following: starting from the current configuration and being invalid until the next reconfiguration; starting from the current configuration and being invalid after T time units; starting from the current configuration and being invalid after the Y1th time of sending of the first type of signaling, or the Y2th time of successful reception of the first type of signaling, or the Y3th time of sending of the second type of signaling, or the Y4th time of successful reception of the second type of signaling; invalid after T time units when a triggering threshold satisfies a condition; invalid after T time units after the last time the first communication node feeds back ACK/NACK to the second communication node; invalid after T time units after the last time the first communication node receives the ACK/NACK fed back by the second communication node; invalid after T time units after the last time the second communication node sends ACK/NACK to the first communication node; or invalid after T time units after the last time the second communication node sends ACK/NACK to the first communication node; T, Y1, Y2, Y3 and Y4 are integers greater than or equal to 1, and T, Y1, Y2, Y3 and Y4 may be predefined or configured by the first communication node or the second communication node.

Optionally, a physical layer of the first communication node sends a link failure request to a high layer after the number of times that the first communication node sends the first type of signaling to the second communication node, or cumulative waiting time or a combination of the number of times and the cumulative waiting time exceeds a sixth threshold.

Optionally, sending power for sending the first type of signaling to the second communication node satisfies one of the following: complying with a power sending rule of a random access channel PRACH, sending using a full power, or sending using a weighted value of previous powers.

Optionally, after sending the first type of signaling, the method of this embodiment further includes: at least one of a reference signal, a downlink control channel or a downlink data channel, which is sent to the first communication node by the second communication node and a reference signal of a first type of information indication beams satisfy a QCL assumption by default.

Optionally, after the sending the second type of signaling, the method further includes: at least one of a reference signal, an uplink control channel or an uplink data channel, which is sent to the second communication node by the first communication node, and a reference signal of a second type of information indication beams satisfy a QCL assumption by default.

Optionally, the second type of signaling contains identity information of the first communication node.

Optionally, the second type of signaling further contains at least one of the following information: a sending configuration of a reference signal sent to the second communication node by the first communication node; a measurement configuration of a reference signal sent to the second communication node by the first communication node; a report configuration of a reference signal sent to the second communication node by the first communication node; a sending configuration of a reference signal sent to the first communication node by the second communication node; a measurement configuration of a reference signal sent to the first communication node by the second communication node; or a report configuration of a reference signal sent to the first communication node by the second communication node.

Optionally, when the first type of signaling is unable to uniquely indicate the identity of the first communication node, after receiving the second type of signaling, the first communication node sends a third type of signaling to the second communication node, where the third type of signaling contains a unique identity of the first communication node.

Optionally, after the sending the third type of signaling, the method of this embodiment further includes: the first communication node attempting to receive a fourth type of signaling from the second communication node, where the fourth type of signaling contains the unique identity of the first communication node, or the fourth type of signaling represents a beam link establishment of the first communication node and the second communication node based on a case in which the fourth type of signaling is able to be successfully received and decoded according to the unique identity of the first communication node.

Through the above description of the implementation, those skilled in the art can clearly learn that the method according to the abovementioned embodiment may be realized in a manner of combining software and a necessary general hardware platform, and may certainly be realized by hardware as well. However, in many cases, the former is the better implementation. Based on such an understanding, the technical solution of the present disclosure in nature or the part making a contribution to the related technology may be embodied in a form of software products; the computer software products are stored in a storage medium (e.g., ROM/RAM, a magnetic disk, an optical disc), including several commands to enable a terminal device (a mobile phone, a computer, a server or a network device etc.) to perform the method of each embodiment of the present disclosure.

Embodiment 2

This embodiment further provides a processing apparatus for recovering a beam, configured to realize the abovementioned embodiments and the preferable implementations. The contents which have been described will not be repeated. As used hereinafter, the term "module" may realize a combination of software and/or hardware having a predetermined function. Although the apparatus described in the following embodiments is preferably realized by the software, realization of the hardware or a combination of the software and the hardware may also be conceived.

Figure 3:
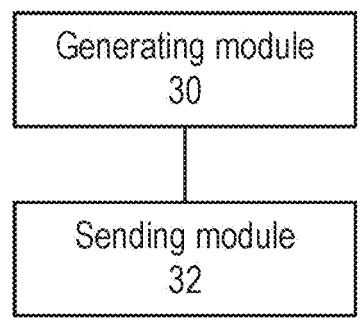
FIG. 3 is a structure block diagram of a processing apparatus for recovering a beam according to an embodiment of the present disclosure.

FIG. 3 is a structure block diagram of a processing apparatus for recovering a beam according to an embodiment of the present disclosure. As shown in FIG. 3, the apparatus includes: a generating module 30 configured to generate a first type of signaling when K elements in a beam related parameter set trigger one or more thresholds; and a sending module 32 configured to send the first type of signaling to a second communication node, where the beam related parameter set contains Q elements, where Q and K are both positive integers, and K is less than or equal to Q.

Figure 4:
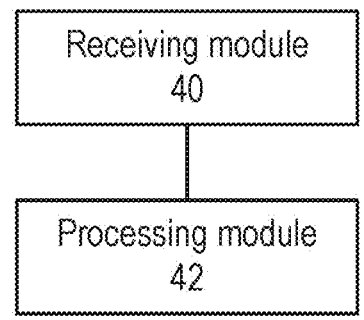
FIG. 4 is a structure block diagram of another processing apparatus for recovering a beam according to an embodiment of the present disclosure.

FIG. 4 is a structure block diagram of another processing apparatus for recovering a beam according to an embodiment of the present disclosure. As shown in FIG. 4, the apparatus includes: a receiving module 40 configured to receive a first type of signaling, where the first type of signaling is generated by a first communication node when K elements in a beam related parameter set trigger one or more thresholds; and a processing module 42 configured to execute a beam link recovery using the K elements when a beam link from the first communication node to the second communication node is interrupted, where the beam related parameter set contains Q elements, where Q and K are both positive integers, and K is less than or equal to Q.

Optionally, the first type of signaling includes at least one of the following: one piece of or a group of beam report information, or a scheduling request; where the beam report information is represented by at least one of the following information sent by the first communication node or the second communication node: a reference signal port index, a reference signal resource index, a reference signal resource set index, a reference signal resource allocation index, an index corresponding to an element in a search space set, or an index corresponding to an element in an agreed beam set.

Optionally, the first type of signaling is used for at least one of the following: actively initiating a beam report; applying for a scheduling resource; initiating a beam link recovery; or initiating a beam link establishment.

It should be noted that the abovementioned various modules may be realized by the software or hardware; the later may be realized in, but not limited to, the following ways: the abovementioned modules are located in the same processor; or, the abovementioned modules are located in different processors respectively in any combination form.

Embodiment 3

This embodiment relates to a method and apparatus for implementing beam recovery configuration in a scene of high-frequency band 5G mobile communication or millimeter wave communication.

In a millimeter wave communication system in the related art, directed beam communication also reduces diversity of signals in space propagation while obtaining the current link gain, and further may face influence of moving users and blocked channels, causing poor robustness of directed communication. Especially, in a scene in which a UE moves fast, or during DRX, the reliability of wireless communication cannot be guaranteed while communicating again.

Through an embodiment of the present disclosure, a base station configures one or a group of symbols/sequences for the user, and the user selects a symbol/sequence from a selectable set to execute beam recovery, to identify subsequent failure of the user beam link and indicate the recommended beam recovery method. Then, through a QCL-based beam indication or beam rollback method, the user may inform the base station of potential available beam information so as to realize fast beam link recovery. On the one hand, the user may quickly inform the base station after the beam link failure to avoid unnecessary signal transmission; on the other hand, a new beam link establishment process may speed up based on the configured beam recovery method and an indication for the new potential beam link.

The reference signals of this embodiment at least include one of the following:
 a Cell Reference Signal (CRS);
 a Channel State Information Reference Signal (CSI-RS);
 a beam management channel state information reference signal;
 a Channel State Information Interference Measurement signal (CSI-IM);
 a Demodulation Reference Signal (DMRS);
 a downlink demodulation reference signal;
 an uplink demodulation reference signal;
 a channel Sounding Reference Signal (SRS);
 a Phase Tracking Reference Signal (PT-RS);
 a Motility-related Reference Signal (MRS);
 a Beam Reference Signal (BRS);
 a Beam Refining Reference Signal (BRS);
 a Random Access Channel signal (RACH);
 a Synchronization Signal (SS);
 a Synchronization Signal block (SS block);
 a Primary Synchronization Signal (PSS); or a Secondary Synchronization Signal (SSS).

The identity includes, but not limited to: a MAC address, a Cell Radio Network Temporary Identifier (C-RNTI), a Temporary C-RNTI (TC-RNTI), or a dedicated ID allocated to the UE by the base station.

A group of beam related information refers to grouping beams having the same channel characteristic and/or transmission scheme and related channel state information into a set; and the grouping criterion includes any one or more of the following combination modes:
 grouping according to a receiving mode;
 grouping according to a received beam combination;
 grouping according to an antenna group;
 grouping according to the received signal power;
 grouping according to a horizontal sending azimuth angle;
 grouping according to a vertical sending azimuth angle;

grouping according to a horizontal receiving azimuth angle;
grouping according to a vertical receiving azimuth angle;
grouping according to an average arrival time;
grouping according to a cluster arrival time;
grouping according to a received resource corresponding to the resource;
grouping according to a predetermined multiplexing way;
grouping according to a Timing Advance (TA) parameter;
grouping according to a Cyclic Prefix (CP) length;
grouping according to a space division multiplexing way; or
grouping according to a QCL relation.

The extreme case of the beam group, i.e., the number of beams of each group is 1.

The channel features include physical propagation channel features, e.g., the horizontal sending azimuth angle, the vertical sending azimuth angle, the horizontal receiving azimuth angle, the vertical receiving azimuth angle and the like, and also include features of radio frequency and baseband circuits, e.g., an antenna element pattern, antenna placement, and baseband time bias, frequency bias and phase noise and the like.

The group of this embodiment may also be referred to as a set.

The channel features include physical propagation channel features, e.g., the horizontal sending azimuth angle, the vertical sending azimuth angle, the horizontal receiving azimuth angle, the vertical receiving azimuth angle and the like, and also include features of radio frequency and baseband circuits, e.g., an antenna element pattern, an antenna group, a balance panel, an antenna subarray, a Transmitting-Receiving Unit (TXRU), a received beam set, antenna placement, and baseband time bias, frequency bias and phase noise and the like.

The beam may be a resource (e.g., a sending end precoding, a receiving end precoding, an antenna port, an antenna weight vector, an antenna weight matrix and the like). A beam symbol may be replaced with a resource matrix, since the beam may be in transmission binding with some time frequency code resources. The beam may also be a transmission (sending/receiving) way; and the transmission mode may include space division multiplexing, frequency domain/time domain diversity and the like.

The beam indication refers to that the sending end may indicate in a way that the current reference signal and the antenna port satisfy QCL assumption with the reference signal (or base reference signal) scanned by the base station or fed back and reported by the UE and the antenna port.

The received beam refers to a beam of the receiving end without an indication, or a beam resource of the receiving end under an indication of the sending end that the current reference signal and the antenna port satisfy QCL with the reference signal (or base reference signal) scanned by the base station or fed back and reported by the UE and the antenna port.

The parameters involved in the QCL at least include: Doppler spread, Doppler shift, delay spread, average delay and average gain; and may also include: space parameter information, e.g., an arrival angle, a space correlation of received beams, an average delay, and a correlation of time-frequency channel responses (including phase information).

Framework Embodiment

Figure 5:
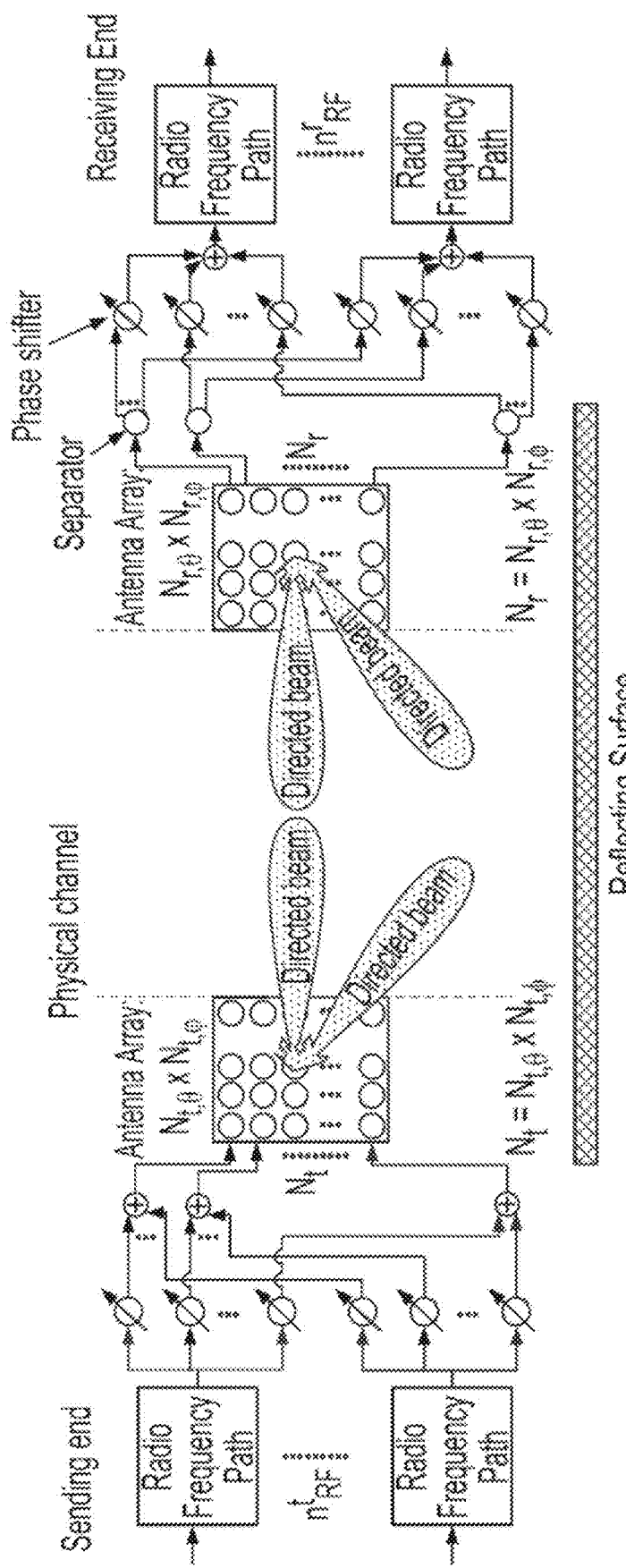
FIG. 5 is a schematic structural diagram of a hybrid precoding (hybrid analog-digital beamforming)-oriented transceiver according to an embodiment of the present disclosure.

FIG. 5 is a schematic structural diagram of a hybrid precoding (hybrid analog-digital beamforming)-oriented transceiver according to an embodiment of the present disclosure. A sending end and a receiving end of the system are configured with a multi-antenna unit and a plurality of radio frequency links. Each radio frequency link is connected with an antenna array unit (not excluding a partial connection scene), and each antenna unit has a digital key phase shifter. Through a method of loading different amounts of phase shift to a signal on each antenna unit, a high-frequency band system realizes beamforming at a simulation module. For example, in a hybrid beamforming transceiver, a plurality of radio frequency signal flows exist. Each signal flow is applied with AWV through the digital key phase shifter and is sent to the high-frequency band physical propagation channel from the multi-antenna unit; at the receiving end, the radio signal flows received by the multi-antenna unit are weighted and merged into a single signal flow, and are subjected to radio frequency demodulation via the receiving end; and the receiver finally obtains a plurality of received signal flows and sampled and received by a digital baseband. Therefore, a hybrid precoding (hybrid analog-digital beamforming) transceiver may simultaneously generate radio frequency beams pointing to a plurality of directions.

The triggering conditions, the measurement pilot, the possible configuration and the sending way (which kind of channel) of the first type of signaling are as follows.

When the CQI quality fed back by the user is too low, or the NACK performance is poor, or it requires entering the DRX phase, and the quality of K beam links in use is inferior to the threshold, or the cumulative time from the last successful reception of the control channel/data channel is greater than the threshold, the base station executes beam recovery configuration for the user. Alternatively, after the user accesses the system, the system will activate beam recovery configuration for the user. It should be noted that, during beam recovery configuration, one or more user dedicated sequences will be allocated to each user. If a plurality of user dedicated sequence signaling may be used for indicating different beam recovery schemes, the parameters possibly involved are as follows: an identity of the first communication node; O time-frequency resource locations sent by the first signaling; a correspondence between the time-frequency resource locations sent by the first signaling and an indicated reference signal; a transmission mode of sending control signaling to the first communication node by the second communication node after sending the first type of signaling; a time-frequency resource or a time-frequency resource range occupied by sending the control signaling to the first communication node by the second communication node after sending the first type of signaling; a blind test criterion of sending the control signaling to the first communication node by the second communication node after sending the first type of signaling; a sending configuration of the reference signal sent to the second communication node by the first communication node; a measurement configuration of the reference signal sent to the second communication node by the first communication node; a report configuration of the reference signal sent to the second communication node by the first communication node; a sending configuration of the reference signal sent to the first communication node by the second communication node; a measurement configuration of the reference signal sent to the first communication node by the second communication node; or a report configuration of the reference signal sent to the first communication node by the second communication node.

O is an integer greater than or equal to 1. The configuration of the reference signal configuration may be used for speeding up discovery of a potential available beam set before the UE initiates beam recovery for the first signaling or used for the subsequent beam refining after the first signaling. When any one of or a combination of any several of the following triggering conditions are satisfied, the user will attempt to initiate the beam recovery flow to send the first type of signaling (beam recovery signaling) on the dedicated channel, and try to inform the base station of one or more pieces of available downlink transmitting beam information through a method for explicitly and/or implicitly occupying a location of the time-frequency resource:

when the qualities of the first type of beam links with a number of N are greater than or equal to a public threshold or a respective threshold; when the difference or ratio of the qualities of the first type of beam links with the number of N to the sum of qualities of the second type of beam links with a number of K is greater than or equal to a public threshold or a respective threshold; when a correlation of time-frequency channel responses, a correlation of frequency-domain channel responses or a space domain correlation of the first type of beam links with the number of N and the second type of beam links with the number of K is lower than a public threshold or a respective pairwise threshold; when the difference or ratio of the azimuth angles of the first type of beam links with the number of N to the azimuth angles of the second type of beam links with the number of K is greater than or equal to a public threshold or a respective pairwise threshold; when the qualities of the second type of beam links with the number of K are less than a public threshold or a respective threshold; when the quality of all the second type of beam links is less than a public threshold or a respective threshold; when the cumulative time from last successful reception of the control channel/data channel is greater than a public threshold or a respective threshold; when the cumulative number of times of unsuccessful reception is greater than a public threshold or a respective threshold; adjustment information of the beam group; or a weighted value or weighted correlation value of a part of the above parameters.

For example, in a type of combination conditions, when the qualities of the second type of beam links with the number of K are less than a public threshold, and at the same time, a received signal power is discovered that a beam of a first kind may be higher than the threshold, the user may initiate the following beam recovery flow. It should be emphasized that, if channel dissimilarity or beam correspondence is supported, the user may quickly send the first type of signaling (beam recovery signaling) on a specific beam recovery channel. If channel dissimilarity or beam correspondence is not supported on the uplink or downlink, only guiding the downlink beam is considered, and the uplink beam is unknown, the first type of signaling (beam recovery signaling) is required to be repeatedly sent on a plurality of time-frequency resources, or necessary scanning of the uplink beam is executed. As an example, the quality of the first type of beam links may refer to the quality of the unmarked beam links, and the quality of the second type of beam links may refer to the quality of the marked beam links.

The beam recovery flow includes: 1) the conditions satisfy triggering user behavior; 2) the user discovers a potential available beam; 3) the first type of signaling is sent to inform the TRP of event sending; 4) the TRP feeds back the second type of signaling to make a beam recovery response; 5) the UE sends the third type of signaling and reports detail identity information (optionally, facing contention and the UE-group scene); and 6) the TRP sends the fourth type of signaling to feedback and confirm the UE identity information.

Figure 6:
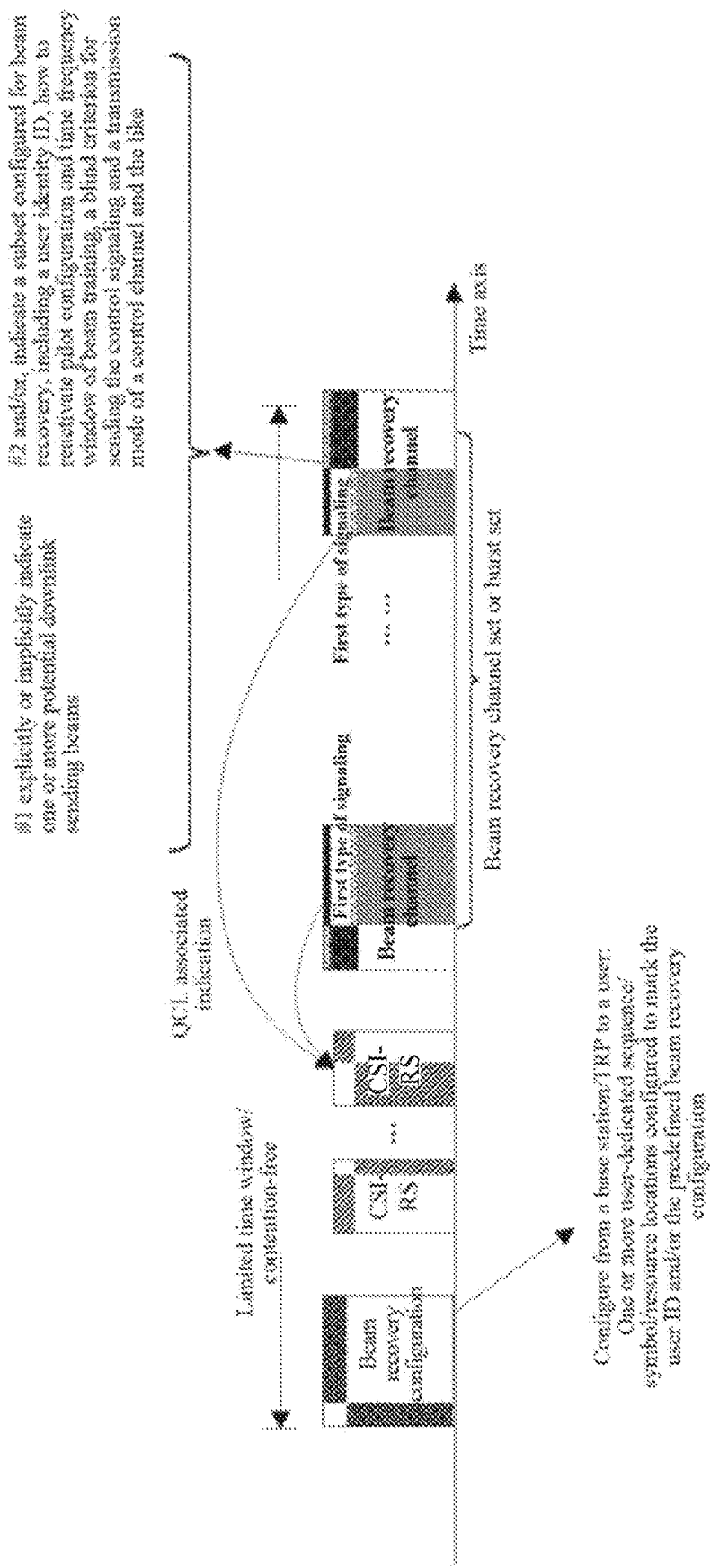
FIG. 6 is a CSI-RS reference signal-oriented beam recovery configuration and activation process according to an embodiment of the present disclosure.

FIG. 6 is a CSI-RS reference signal-oriented beam recovery configuration and activation process according to an embodiment of the present disclosure. The base station/TRP execute a beam recovery configuration for the user, the user has a dedicated sequence/symbol or resource location which may be used for indicating the user ID and/or the predefined beam recovery configuration. Once the UE discovers that the quality of the current communication link is insufficient, the beam recovery flow is activated, and the UE will attempt to search the periodically sent CSI-RS signaling. If an available downlink beam link is discovered, the user sends the first type of signaling to the base station through the beam recovery channel, to identify failure of the beam link and indicate a potential downlink beam. Here, a scene without channel dissimilarity or beam correspondence is taken into consideration, the UE needs to perform a method for sending the first type of signaling to the base station end for multiple times to perform uplink beam scanning. The first type of signaling, in addition to indicating the downlink transmitting beam, may indicate a subset, including the user identity ID, how to reactivate pilot configuration and time frequency window of beam training, the blind criterion for sending the control signaling and the transmission mode of the control channel and the like. The identity ID here may be a user dedicated ID and may also be a shared identity ID after combining the UEs.

Figure 7A:
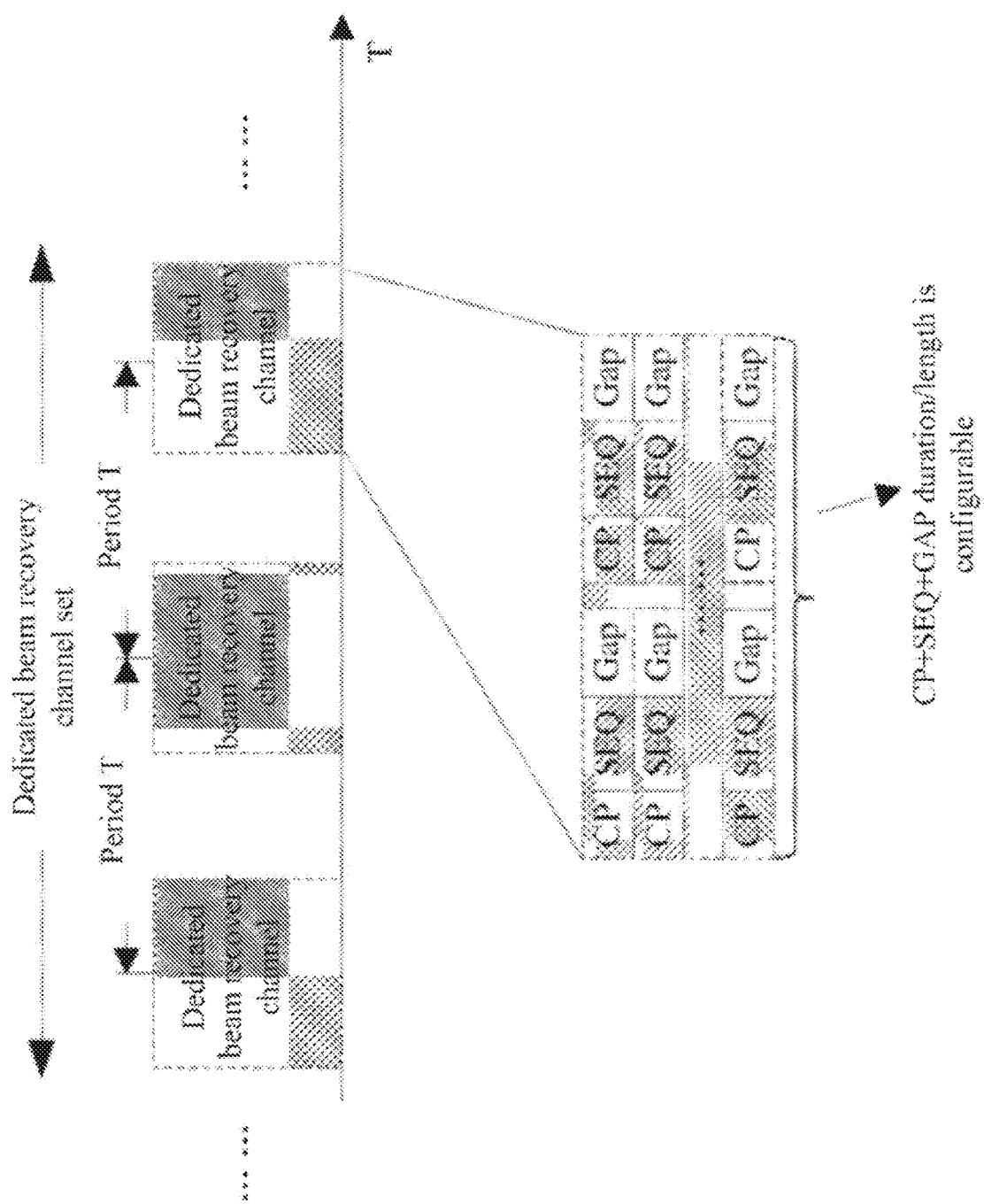
FIGS. 7A and 7B are schematic structural diagrams of a dedicated beam recovery channel (hereinafter referred to as a dedicated channel) according to an embodiment of the present disclosure.
Figure 7B:
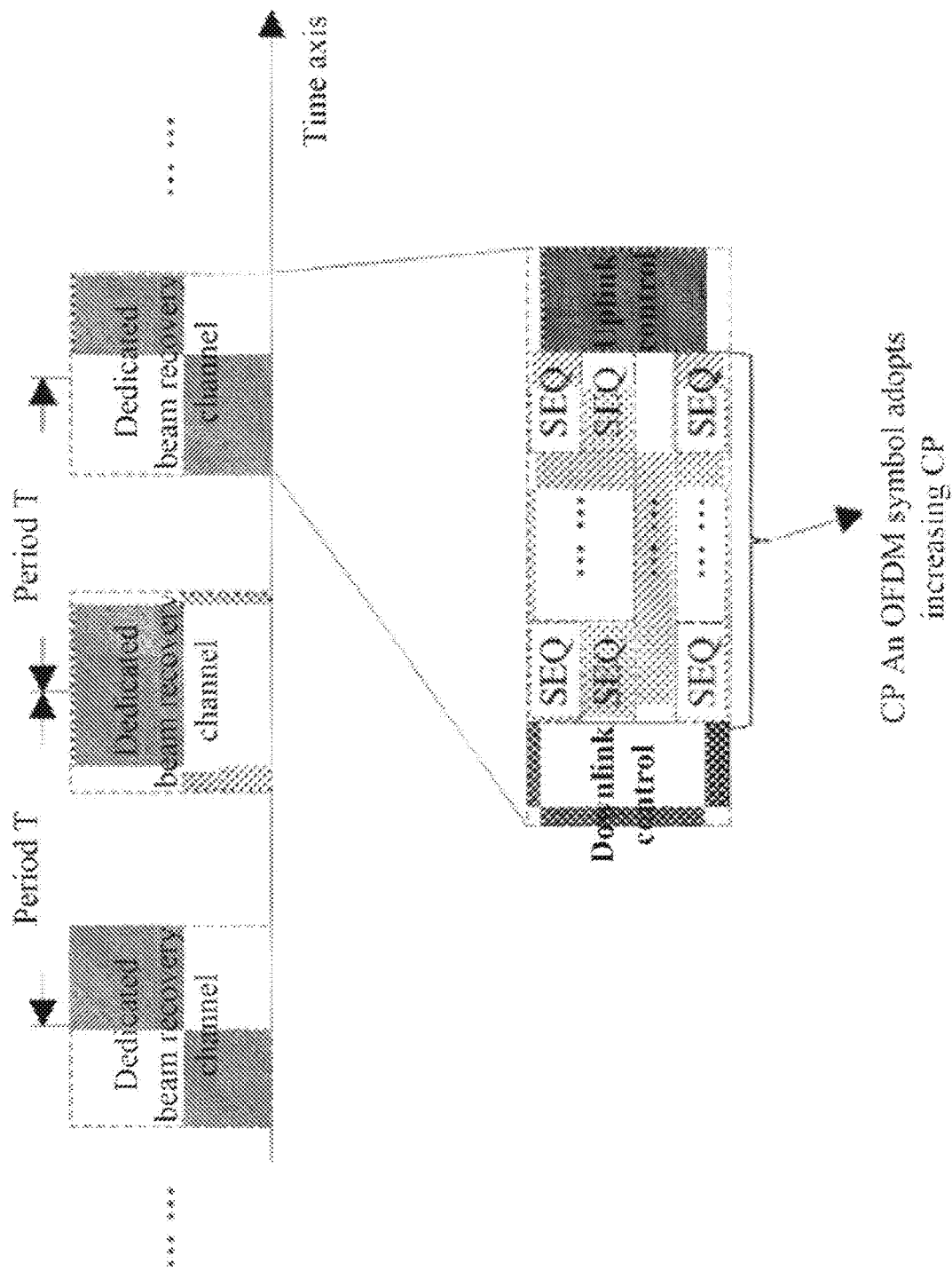

FIGS. 7A and 7B are schematic structural diagrams of a dedicated beam recovery channel (hereinafter referred to as a dedicated channel) of an embodiment of the present disclosure, where FIG. 7A shows that the duration or length occupied by CP+SEQ is configurable and contains a protection gap; while FIG. 7B shows that the normal OFDM symbol is still in use, but a common or increasing CP is used. It should be noted that, FIG. 7A may be applied to a scene of uplink synchronization failure by adjusting a sample window, while FIG. 7B is more suitable for a scene in which the uplink synchronization is still valid, and the expense thereof is less than that of the method of FIG. 7A. A plurality of dedicated channels may constitute a dedicated channel set, while a dedicated channel set corresponds to scanning of a full space/dedicated space of the uplink received beam; the received beam of each dedicated channel is constant, but the location of the time-frequency resource is in a binding relation with the reference channel sent previously, i.e., sending the first type of signaling in this location to implicitly indicate the downlink transmitting beam. For example, according to the method based on first frequency and then time domain, correlation is orderly made to the previous CSI-RS or SS block respectively.

The dedicated beam recovery channel set is composed of X dedicated beam recovery channels (the pairwise period is T), to realize uplink beam training. Therefore, description of the subsequent blind test window of the second signaling may be started based on the Uth dedicated beam recovery channel, where U is an integer greater than or equal to 1. This means that, among a plurality of dedicated beam recovery channel, the user needs to perform blind test for channels of a second kind.

Figure 8:
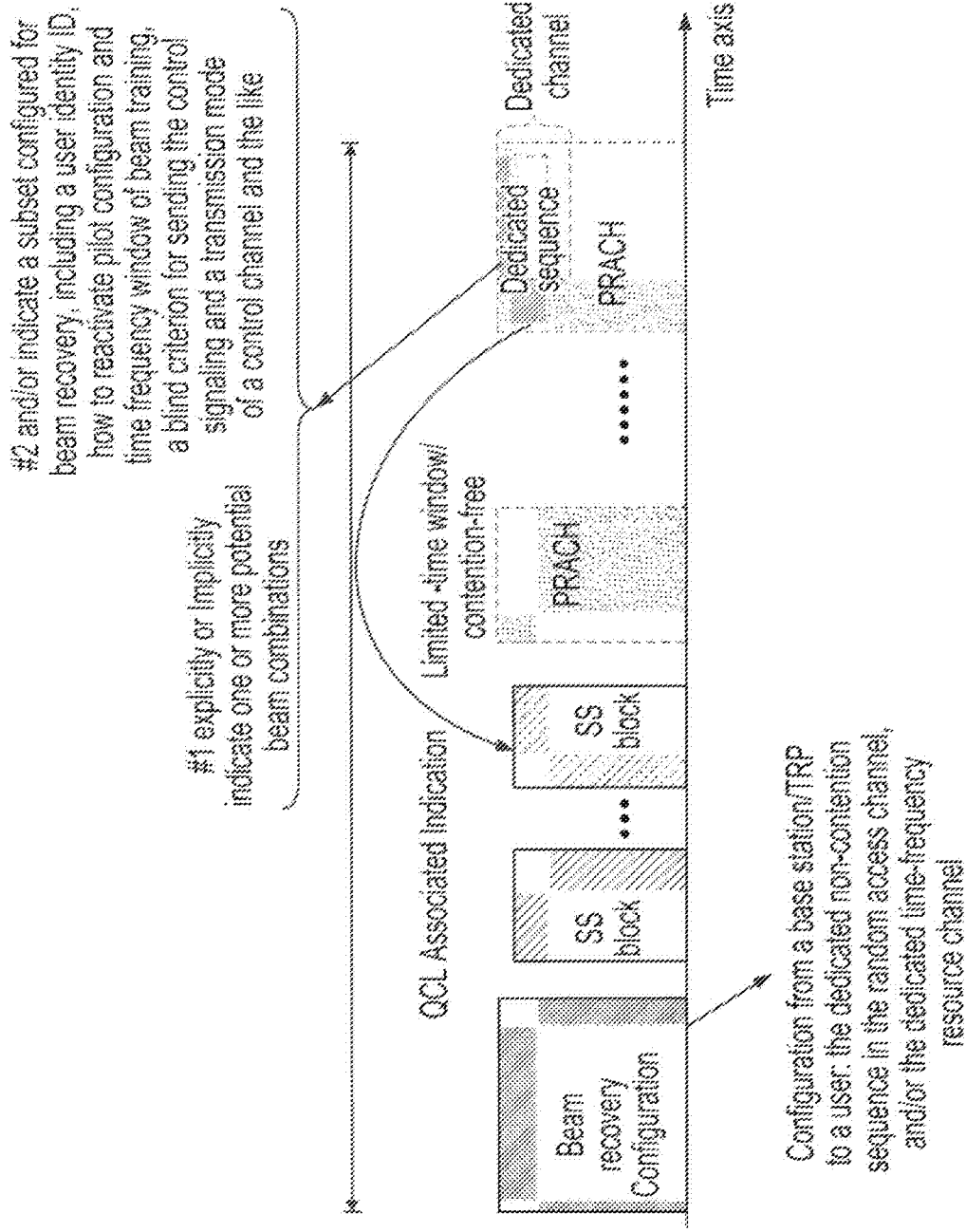
FIG. 8 is a SS block-oriented beam recovery process according to an embodiment of the present disclosure.

FIG. 8 is a SS block-oriented beam recovery process according to an embodiment of the present disclosure. It takes various reference signal types into consideration, and therefore, the base station needs to specify the reference signal type that allows beam recovery. The dedicated sequence is carried in a dedicated channel divided from the PRACH channel. The dedicated sequence is configured in a parameter set of the first type of signaling, and may also be considered as the first type of signaling. Where QCL associated indication may correspond to SSS, PSS in the SS block or DMRS channel of the PB CH.

The sent content and joint beam training of the second type of signaling are introduced hereafter.

Figure 9:
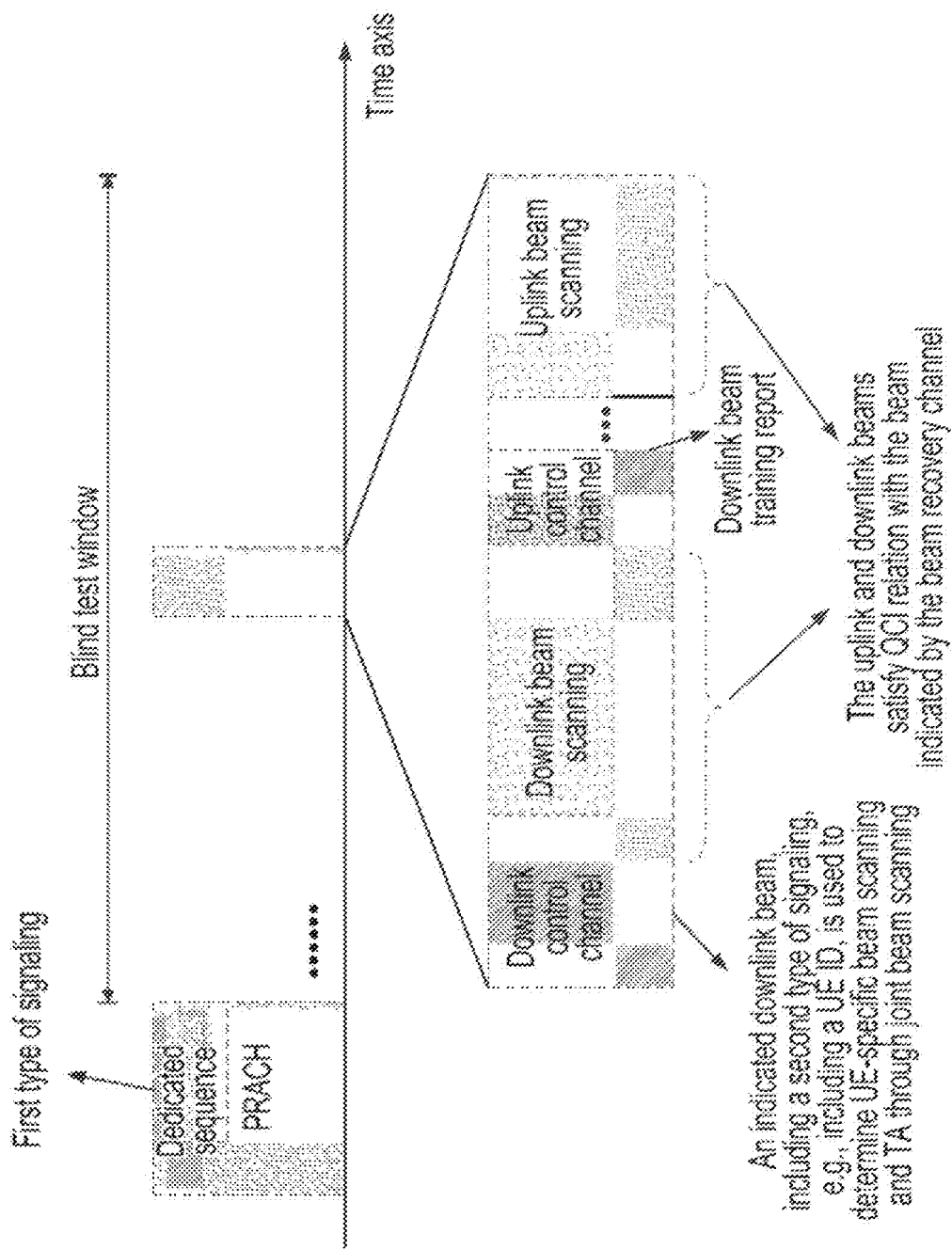
FIG. 9 is a beam recovery process for a second type signaling according to an embodiment of the present disclosure.

FIG. 9 is a beam recovery process for a second type signaling of an embodiment of the present disclosure. The second type of signaling is carried in the downlink control channel, but may also be carried in the downlink data channel. Since the user of blind test window uses the indicated downlink received beam by default according to the first type of signaling, the base station uses the indication downlink transmitting beam. The second type of signaling needs to contain the identity ID of the user and the joint beam scanning to determine the UE dedicated beam scanning indication and the timing advance (TA).

When beam scanning sending is required to the first type of signaling, it requires to carry a beam indication regarding the optimal uplink sent beam in the second type of signaling. An indication index of the second type of signaling comes from an index number of the dedicated channel. To save the expense, encoding may be executed to N adjacent dedicated channels.

In the second type of signaling, joint uplink and downlink beam scanning may be configured. Since the indication beam for beam recovery may be a wide beam for reducing the expense, for the subsequent data transmission, a refined beam is required for better data transmission. Therefore, the downlink beam scanning and uplink beam scanning may speed up the entire process of beam recovery. It should be noted that, if the dedicated UE ID is used by the first type of signaling, then the uplink and downlink beam training may be triggered simultaneously. However, if the UE group ID is used by the first type of signaling, the downlink beam training may be carried out here, while the uplink beam training needs to wait after determination of the UE. Otherwise, a plurality of UEs may initiate uplink beam training simultaneously, so that meaningless uplink beam training may be carried out. When the UE ID is not determined, beam training is carried out again after the user sends the unique ID on the subsequent PUCCH. In the beam training, the downlink transmitting beam and the beam indicated by the first type of signaling for the beam recovery satisfy QCL assumption, while the uplink sent beam and the beam indicated by the second type of signaling satisfy the QCL assumption.

The length of the blind test window and the resource location of the blind test from the parameter set of the beam recovery configuration may be configured.

The sent contents (group-oriented UE ID) of the third type of signaling and the fourth type of signaling are described as follows.

Figure 10A:
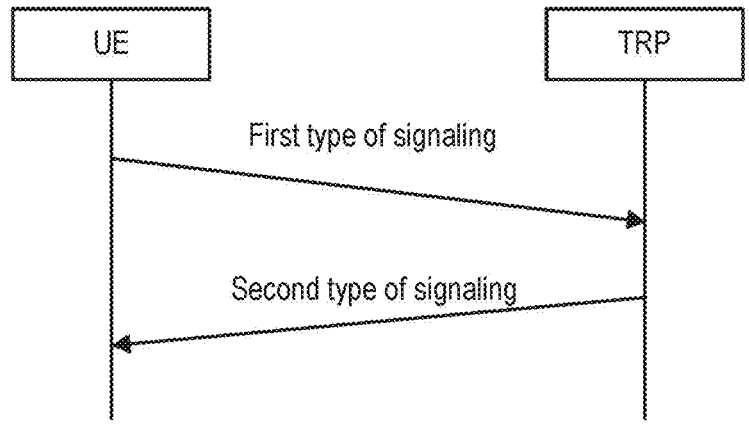
FIGS. 10A and 10B are schematic diagrams of a signaling interaction mode according to an embodiment of the present disclosure.
Figure 10B:
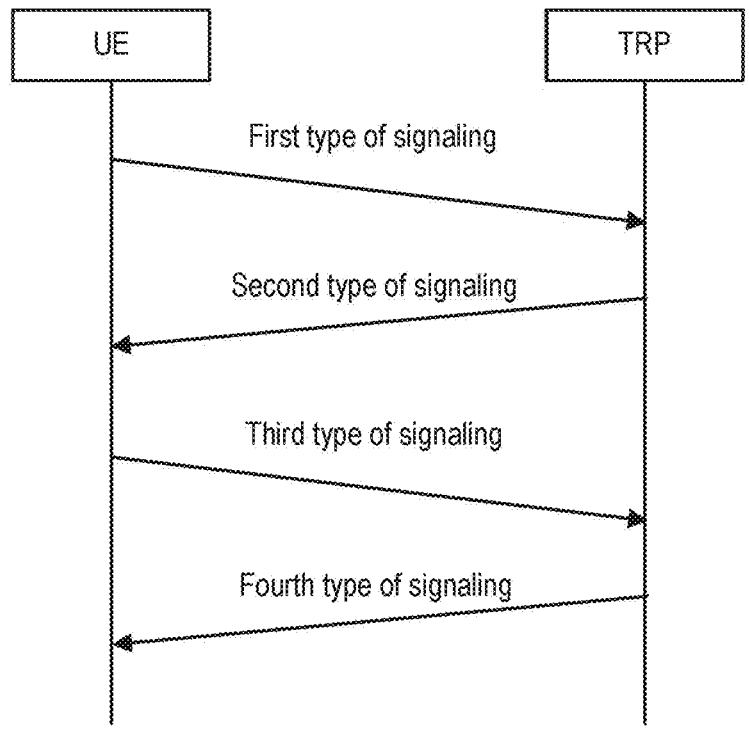

FIGS. 10A and 10B are schematic diagrams of a signaling interaction mode according to an embodiment of the present disclosure. FIGS. 10A and 10B correspond to the signaling of the first and second kinds (two-step mode) respectively, two scenes from the first type of signaling to the fourth type of signaling (four-step mode) is included. The former corresponds to that the first type of signaling contains the unique UE ID, and the later corresponds to that the second type of signaling contains the UE group ID or contention-based ID number. In an example, the first type of signaling represents sending to the base station from the user (uplink), and the beam recovery applying for reporting; the second type of signaling represents sending to the user from the base station (downlink), and the beam recovery making a response; the third type of signaling represents sending to the base station from the user (uplink), and reporting the user identity information; and the fourth type of signaling represents sending to the user from the base station (downlink), and the base station confirming the user identity information.

The third type of signaling and the fourth type of signaling are adapted to the situation that the information in the first type of signaling cannot be indicated. For the base station, different IDs may be allocated to UEs having different priority levels according to the features of the UE, i.e., whether it is dedicated, group-based or completely competitive. The three configurations described here may be realized for a base station simultaneously.

Figure 11:
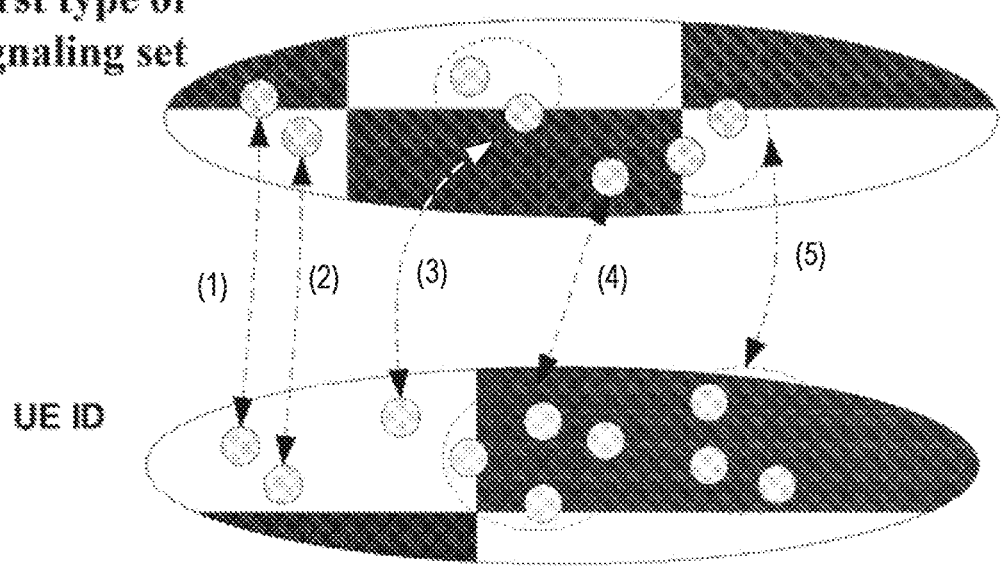
FIG. 11 is a schematic diagram of the relationship between a first type of signaling set and a UE ID according to an embodiment of the present disclosure.

FIG. 11 is a schematic diagram of the relationship between a set of a first type of signaling and a UE ID of an embodiment of the present disclosure. In the figure, the UE ID is a dedicated ID, but since the first type of signaling may correspond to a plurality of UE IDs, the beam ID cannot be directly determined through the first type of signaling at this moment. For the third type of signaling, in order to save the expense, feedback may only be made to the number after UE ID encoding designed for the first type of signaling. For example, (4) involves that the recoded number among the four UE IDs carried in the third type of signaling only needs two bits (00, 01, 10, 11). After sending the third type of signaling, the user attempts to receive the fourth type of signaling from the TRP. If the fourth type of signaling contains the unique identity of the first communication node, or the fourth type of signaling can be successfully received and decoded according to the unique identity of the first communication node, it represents establishment of the beam links of the first communication node and the second communication node.

After success of the two-step and four-step modes, the user will indicate success of beam recovery to the high layer.

If it fails, RLF makes a statement and accesses using the PRACH (including contention-free time).

Figure 12:
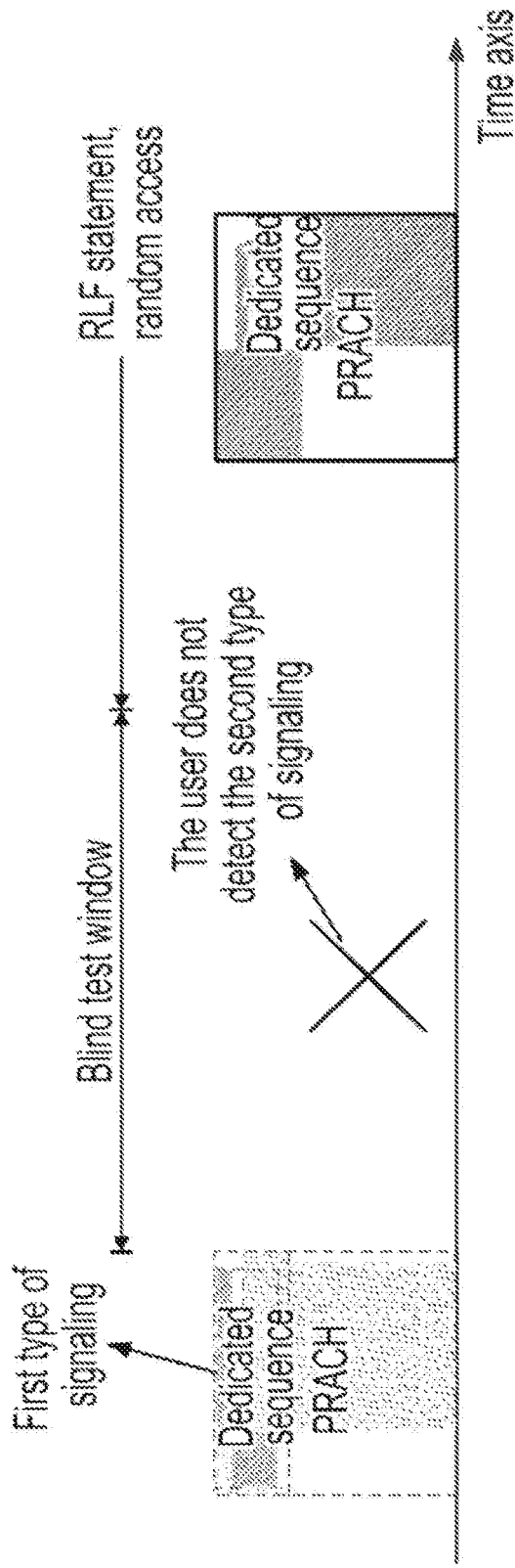
FIG. 12 is a schematic diagram of PRACH random access used after failure of beam recovery according to an embodiment of the present disclosure.

FIG. 12 is a schematic diagram of PRACH random access used after failure of beam recovery according to an embodiment of the present disclosure. Under the blind test window, the second type of signaling from the base station end is not successfully received, the UE needs to send radio link failure to the high layer. At this time, the UE will attempt to use the basic PRACH to carry out wireless access.

In this embodiment, a beam reporting method based on the scheduling request is described as follows.

Figure 13:
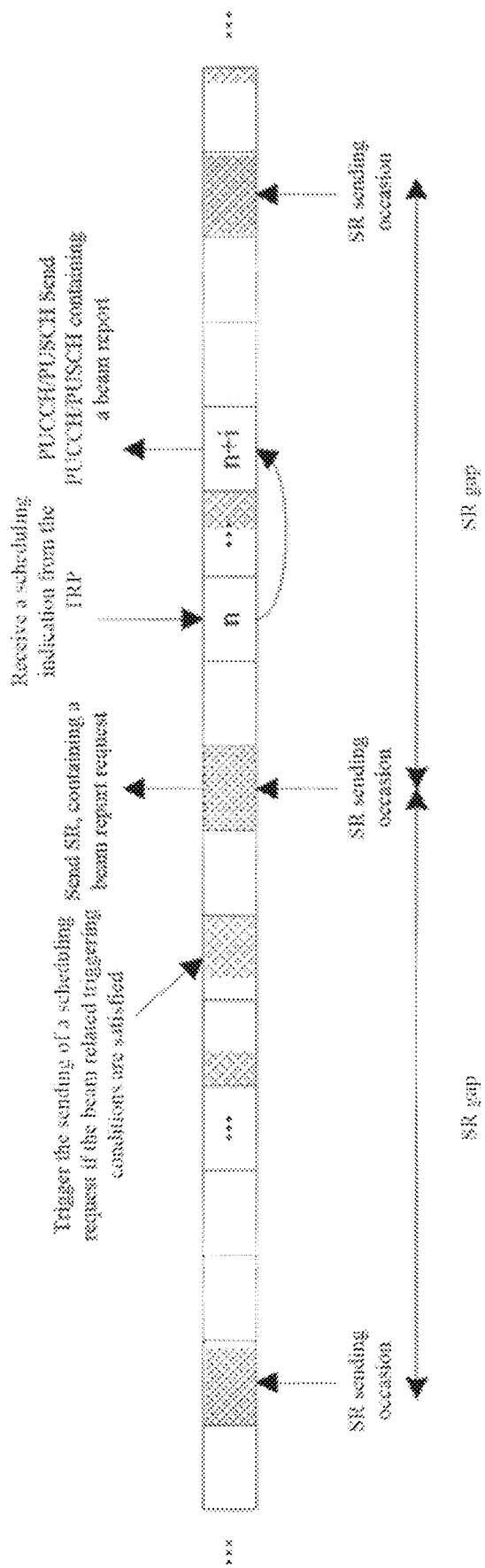
FIG. 13 shows an embodiment of a scheduling request-based beam report according to an embodiment of the present disclosure.

FIG. 13 shows an embodiment of a scheduling request-based beam report according to an embodiment of the present disclosure. The scheduling request is a simple representation issued by the terminal for requesting an uplink resource for an uplink scheduler, where it requires signaling containing beam report request. At the preconfigured SR gap, the user will be allocated with a sending opportunity of the Scheduling Request (SR). When the beam related triggering conditions are satisfied, sending of the scheduling request is triggered, and SR sending of the beam request report will be executed at the adjacent SR sending occasion. After receiving the scheduling request response to the scheduling request faced by the TRP, the user will execute beam report on the resource allocated by the scheduling request response. Two configurations are included here, one is that, the reporting resource is the uplink control channel (PUCCH), and the beam report is carried by the UCI; the second is that, if the reporting resource is the uplink data channel (PDCCH), the beam report is carried by the MAC- CE or the RRC signaling. The beam report at least contains one piece of the following information: an indicated reference signal kind, a reference signal resource set index, a reference signal resource index, and a reference signal port index. For example, the mark comes from the beam report for the reference signal SSS.

In conclusion, based on the technical solution provided by an embodiment of the present disclosure, a base station configures one or a group of symbols/sequences for the user, and the user selects a symbol/sequence from a selectable set to execute beam recovery, to mark subsequent failure of the user beam link and indicate the recommended beam recovery method. Then, through a QCL-based beam indication or beam rollback method, the user may inform the base station of potential available beam information so as to realize fast beam link recovery. For the solution, on the one hand, the user may quickly inform the base station after the beam link failure to avoid unnecessary signal transmission; on the other hand, a new beam link establishment process may speed up based on the configured beam recovery method and an indication for the new potential beam link.

Embodiment 4

An embodiment of the present disclosure further provides a storage medium. Optionally, in this embodiment, the storage medium may be configured to store a program code for performing the following steps: S1, generating a first type of signaling when K elements in a beam related parameter set trigger one or more thresholds; and S2, sending the first type of signaling to a second communication node.

Optionally, in this embodiment, the storage medium may include, but not limited to: a USB flash disk, a Read-Only Memory (ROM), a Random Access Memory (RAM), a removable hard disk, a magnetic disk or an optical disc and various media which can store the program codes.

Optionally, in this embodiment, according to the program code stored in the storage medium, a processor generates the first type of signaling when K elements in the beam related parameter set trigger one or more thresholds.

Optionally, in this embodiment, the processor sends the first type of signaling to the second communication node according to the program code stored in the storage medium.

Optionally, the specific example in this embodiment may refer to the abovementioned embodiments and the optional implementations, and details are not described here again.

Apparently, those skilled in the art shall understand that various modules or steps of the present disclosure may be realized by universal computing apparatuses and may be integrated on a single computing apparatus or distributed on a network composed of a plurality of computing devices. Optionally, the modules or steps may be realized by using the program code executable by the computing apparatuses, and thus may be stored in the storage apparatus and executed by the computing apparatus. Moreover, in some cases, the shown or described steps may be executed in an order different from the order here, or may be used to make an integrated circuit module respectively, or a plurality of modules or steps thereof are realized in forming the single integrated module. In this way, the present disclosure is not limited to any specific hardware and software combination.

The above are only preferred embodiments of the present disclosure, but are not intended to limit the present disclosure. Various modification and variations to the present disclosure are apparent to those skilled in the art. Any amendments, equivalent substitutions and improvements made within the sprint and principle of the present disclosure should all fall within the scope of protection of the present invention.

The invention claimed is:

1. A method for wireless communication, comprising:
generating, by a terminal device, a first type of signaling that comprises an index corresponding to a resource selected from a set of resources for a reference signal;
transmitting, by the terminal device, the first type of signaling over a random access channel to a base station, wherein the first type of signaling initiates a beam link recovery procedure;
assuming, by the terminal device, a Quasi Co-Location (QCL) relation between (1) the resource and a downlink control channel, and (2) the resource and a downlink data channel;
receiving, by the terminal device from the base station, a second type of signaling carried in the downlink control channel using the QCL relation between the resource and the downlink control channel, wherein the second type of signaling notifies that the base station has received the first type of signaling from the terminal device, the second type of signaling further comprising an identification of the terminal device; and
receiving, by the terminal device from the base station, a data transmission carried in the downlink data channel according to the QCL relation between the resource and the downlink data channel.

2. A method for wireless communication, comprising:
receiving, by a base station, a first type of signaling from a terminal device, the first type of signaling comprising an index corresponding to a resource selected from a set of resources for a reference signal, wherein there is a Quasi Co-Location (QCL) relation between (1) the resource and a downlink control channel and (2) the resource and a downlink data channel, and wherein the first type of signaling initiates a beam link recovery procedure;
transmitting, by the base station to the terminal device, a second type of signaling carried in the downlink control channel using the QCL relation between the resource and the downlink control channel notifying that the base station has received the first type of signaling from the terminal device, the second type of signaling further comprising an identification of the terminal device; and
performing, by the base station to the terminal device, a data transmission carried in the downlink data channel according to the QCL relation between the resource and the downlink data channel.

3. A device for wireless communication, comprising:
a processor, and
a memory including processor executable code, wherein the processor executable code upon execution by the processor configures the processor to:
generate a first type of signaling that comprises an index corresponding to a resource selected from a set of resources for a reference signal;
transmit the first type of signaling over a random access channel to a base station, wherein the first type of signaling initiates a beam link recovery procedure;
assume a Quasi Co-Location (QCL) relation between (1) the resource and a downlink control channel and (2) the resource and a downlink data channel;
receive, from the base station, a second type of signaling carried in the downlink control channel using the QCL relation between the resource and the downlink control channel, wherein the second type of signaling notifies that the base station has received the first type of signaling from a terminal device, the second type of signaling further comprising an identification of the terminal device; and receive, from the base station, a data transmission carried in the downlink data channel according to the QCL relation between the resource and the downlink data channel.

4. A device for wireless communication, comprising:

a processor, and a memory including processor executable code, wherein the processor executable code upon execution by the processor configures the processor to:

receive a first type of signaling from a terminal device, the first type of signaling comprising an index corresponding to a resource from a set of resources for a reference signal, wherein there is a Quasi Co-Location (QCL) relation between (1) the resource and a downlink control channel and (2) the resource and a downlink data channel, and wherein the first type of signaling initiates a beam link recovery procedure;

transmit, to the terminal device, a second type of signaling carried in the downlink control channel using the QCL relation between the resource and the downlink control channel notifying that the first type of signaling has been received, the second type of signaling further comprising an identification of the terminal device; and perform, to the terminal device, a data transmission carried in the downlink data channel according to the QCL relation between the selected resource and the downlink data channel.

5. A non-transitory storage medium having code stored thereon, the code upon execution by a processor, causing the processor to implement a method that comprises:

generating, by a terminal device, a first type of signaling that comprises an index corresponding to a resource selected from a set of resources for a reference signal; and transmitting, by the terminal device, the first type of signaling over a random access channel to a base station, wherein the first type of signaling initiates a beam link recovery procedure;

assuming, by the terminal device, a Quasi Co-Location (QCL) relation between (1) the resource and a downlink control channel, and (2) the resource and a downlink data channel;

receiving, by the terminal device from the base station, a second type of signaling carried in the downlink control channel using the QCL relation between the resource and the downlink control channel, wherein the second type of signaling notifies that the base station has received the first type of signaling from the terminal device, the second type of signaling further comprising an identification of the terminal device; and receiving, by the terminal device from the base station, a data transmission carried in the downlink data channel according to the QCL relation between the resource and the downlink data channel.

6. A non-transitory storage medium having code stored thereon, the code upon execution by a processor, causing the processor to implement a method that comprises:

receiving, by a base station, a first type of signaling from a terminal device, the first type of signaling comprising an index corresponding to a resource selected from a set of resources for a reference signal, wherein there is a Quasi Co-Location (QCL) relation between (1) the resource and a downlink control channel and (2) the resource and a downlink data channel, and wherein the first type of signaling initiates a beam link recovery procedure;

transmitting, by the base station to the terminal device, a second type of signaling carried in the downlink control channel using the QCL relation between the resource and the downlink control channel notifying that the base station has received the first type of signaling from the terminal device, the second type of signaling further comprising an identification of the terminal device; and performing, by the base station to the terminal device, a data transmission carried in the downlink data channel according to the QCL relation between the resource and the downlink data channel.

\* \* \* \* \*